United States Patent
Han

(10) Patent No.: US 10,410,069 B2
(45) Date of Patent: Sep. 10, 2019

(54) APPARATUS FOR PROVIDING AROUND VIEW AND VEHICLE

(71) Applicant: LG ELECTRONICS INC., Seoul (KR)

(72) Inventor: Kihoon Han, Seoul (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 15/345,933

(22) Filed: Nov. 8, 2016

(65) Prior Publication Data
US 2017/0132480 A1 May 11, 2017

(30) Foreign Application Priority Data

Nov. 9, 2015 (KR) .................. 10-2015-0156695

(51) Int. Cl.
*H04N 7/18* (2006.01)
*G06K 9/00* (2006.01)
(Continued)

(52) U.S. Cl.
CPC .......... *G06K 9/00798* (2013.01); *B60K 35/00* (2013.01); *B60R 1/00* (2013.01);
(Continued)

(58) Field of Classification Search
CPC ............................................... H04N 5/23238
See application file for complete search history.

(56) References Cited

U.S. PATENT DOCUMENTS

| 2008/0197990 A1* | 8/2008 | Yamamoto | B60K 35/00 340/438 |
| 2011/0001825 A1* | 1/2011 | Hahn | B60R 1/00 348/148 |

(Continued)

FOREIGN PATENT DOCUMENTS

| CN | 104385987 | 3/2015 |
| CN | 104584100 | 4/2015 |

(Continued)

OTHER PUBLICATIONS

Extended European Search Report in European Application No. 16197777.2, dated Mar. 28, 2017, 7 pages (with English translation).

(Continued)

*Primary Examiner* — Sathyanaraya V Perungavoor
*Assistant Examiner* — Puneet S Dhillon
(74) *Attorney, Agent, or Firm* — Fish & Richardson P.C.

(57) ABSTRACT

An apparatus configured to provide a view around a vehicle includes a display unit; at least one omnidirectional camera module attached to the vehicle and configured to acquire images of surroundings of the vehicle; an interface unit configured to receive steering angle information and vehicle tilt information; and a processor. The processor is configured to generate an omnidirectional image based on the images of the surroundings of the vehicle acquired by the at least one omnidirectional camera module; determine a region in the omnidirectional image that corresponds to the steering angle information or the vehicle tilt information; and control the display unit to display an image of the region in the omnidirectional image that corresponds to the steering angle information or the vehicle tilt information.

15 Claims, 25 Drawing Sheets

(51) Int. Cl.

| | |
|---|---|
| *G06T 7/246* | (2017.01) |
| *B60K 35/00* | (2006.01) |
| *B60R 1/00* | (2006.01) |
| *B60R 11/04* | (2006.01) |
| *G06K 9/52* | (2006.01) |
| *G06T 3/20* | (2006.01) |
| *G06T 3/40* | (2006.01) |
| *H04N 5/232* | (2006.01) |
| *H04N 5/247* | (2006.01) |
| *H04N 5/265* | (2006.01) |
| *G06T 3/00* | (2006.01) |
| *B60R 11/00* | (2006.01) |
| *G06K 9/46* | (2006.01) |

(52) U.S. Cl.
CPC ............. *B60R 11/04* (2013.01); *G06K 9/52* (2013.01); *G06T 3/0062* (2013.01); *G06T 3/20* (2013.01); *G06T 3/40* (2013.01); *G06T 7/246* (2017.01); *H04N 5/23238* (2013.01); *H04N 5/23293* (2013.01); *H04N 5/247* (2013.01); *H04N 5/265* (2013.01); *B60K 2350/106* (2013.01); *B60K 2350/1028* (2013.01); *B60K 2350/1096* (2013.01); *B60K 2350/2013* (2013.01); *B60K 2350/2017* (2013.01); *B60K 2350/2052* (2013.01); *B60K 2350/352* (2013.01); *B60R 2011/004* (2013.01); *B60R 2300/102* (2013.01); *B60R 2300/105* (2013.01); *B60R 2300/205* (2013.01); *B60R 2300/301* (2013.01); *B60R 2300/302* (2013.01); *B60R 2300/303* (2013.01); *B60R 2300/804* (2013.01); *B60R 2300/806* (2013.01); *B60R 2300/8033* (2013.01); *B60Y 2400/92* (2013.01); *G06K 2009/4666* (2013.01)

(56) References Cited

U.S. PATENT DOCUMENTS

| | | | |
|---|---|---|---|
| 2012/0236112 A1* | 9/2012 | Cilia | B60R 11/04 348/36 |
| 2014/0133699 A1* | 5/2014 | Guan | G06K 9/00798 382/103 |
| 2016/0121895 A1* | 5/2016 | Seo | B60W 30/18 701/70 |

FOREIGN PATENT DOCUMENTS

| | | |
|---|---|---|
| DE | 102008046544 | 5/2009 |
| EP | 2990265 | 3/2016 |
| JP | 2010-245821 | 10/2010 |
| KR | 10-2007-0077293 | 7/2007 |
| KR | 10-2013-0095525 | 8/2013 |
| KR | 10-2014-0019575 | 2/2014 |
| KR | 10-2014-0054909 | 5/2014 |
| KR | 10-2014-0102491 | 8/2014 |
| KR | 10-2015-0104859 | 9/2015 |

OTHER PUBLICATIONS

Office Action in Chinese Application No. 201611018620.3, dated Nov. 12, 2018, 20 pages (with English Translation).

\* cited by examiner

APPARATUS FOR PROVIDING AROUND VIEW AND VEHICLE

CROSS-REFERENCE TO RELATED APPLICATION

This application claims an earlier filing date and right of priority to Korean Patent Application No. 10-2015-0156695, filed on Nov. 9, 2015 in the Korean Intellectual Property Office, the contents of which is incorporated herein by reference in its entirety.

TECHNICAL FIELD

The present disclosure relates to an apparatus that adaptively provides a view of surroundings of a vehicle.

BACKGROUND

A vehicle is a machine moved by a user who rides therein. An example of a vehicle is a car.

For convenience of vehicle users, some vehicles include various sensors and electronic devices. For example, some vehicles include various devices for improving driving convenience of users.

With recent growing interest in self-driving cars, sensors installed in self-driving cars are being actively studied. Sensors installed in self-driving cars include cameras, infrared sensors, radar, GPS, lidar, gyroscopes and the like. Among such sensors, the camera plays an important role as a sensor for providing various types of information.

SUMMARY

Systems and techniques are disclosed herein that enable adaptive deployment of safety features in a vehicle.

In one aspect, an apparatus configured to provide a view around a vehicle includes a display unit; at least one omnidirectional camera module attached to the vehicle and configured to acquire images of surroundings of the vehicle; an interface unit configured to receive steering angle information and vehicle tilt information; and a processor. The processor is configured to generate an omnidirectional image based on the images of the surroundings of the vehicle acquired by the at least one omnidirectional camera module; determine a region in the omnidirectional image that corresponds to the steering angle information or the vehicle tilt information; and control the display unit to display an image of the region in the omnidirectional image that corresponds to the steering angle information or the vehicle tilt information.

In some implementations, the at least one omnidirectional camera module is configured to acquire the images of the surroundings of the vehicle by acquiring a front view image, a rear view image, a left view image, a right view image, a bottom view image, and a top view image of the vehicle.

In some implementations, the at least one omnidirectional camera module includes a first omnidirectional camera module attached to a front of the vehicle and configured to acquire a first omnidirectional image of a front view of the vehicle; and a second omnidirectional camera module attached to a rear of the vehicle and configured to acquire a second omnidirectional image of a rear view of the vehicle.

In some implementations, the at least one omnidirectional camera module includes a plurality of cameras. The processor is configured to generate the omnidirectional image based on the images of the surroundings of the vehicle by combining a plurality of images acquired by the plurality of cameras to provide the omnidirectional image of an entire area surrounding the vehicle.

In some implementations, the processor is configured to determine that the vehicle travels in a forward direction; determine, from among front view images included in the omnidirectional image and based on the determination that the vehicle travels in the forward direction, a front view image of a region that corresponds to the steering angle information or the vehicle tilt information; and control the display unit to display the front view image of the region that corresponds to the steering angle information or the vehicle tilt information while the vehicle travels in the forward direction.

In some implementations, the processor is configured to, based on the steering angle information, control the display unit to display an image of a left view or an image of a right view of the vehicle travelling in the forward direction.

In some implementations, the processor is configured to, based on the vehicle tilt information, control the display unit to display an image of a top view or an image of a bottom view of the vehicle travelling in the forward direction.

In some implementations, the processor is configured to determine that the vehicle travels in a first section of a road in which a flat road portion changes to an uphill road portion or in a second section of the road in which a flat road portion changes to a downhill road portion; determine a first point at which the flat road portion changes to the uphill road portion or a second point at which the flat road portion changes to the downhill road portion; and based on the determination that the vehicle travels in the first section or in the second section of the road, control the display unit to display the image of the top view or the image of the bottom view at a predetermined distance ahead of the first point or the second point while the vehicle travels in the first section or in the second section.

In some implementations, the processor is configured to determine that the vehicle travels in a reverse direction; determine, from among rear view images included in the omnidirectional image and based on the determination that the vehicle travels in the reverse direction, a rear view image of a region that corresponds to the steering angle information or the vehicle tilt information; and control the display unit to display the rear view image of the region that corresponds to the steering angle information or the vehicle tilt information while the vehicle travels in the reverse direction.

In some implementations, the processor is configured to, based on the steering angle information, control the display unit to display an image of a left view or a right view of the vehicle travelling in the reverse direction.

In some implementations, the processor is configured to, based on the vehicle tilt information, control the display unit to display an image of a top view or a bottom view of the vehicle travelling in the reverse direction.

In some implementations, the processor is configured to determine that the vehicle travels in a first section of a road in which a flat road portion changes to an uphill road portion or in a second section of the road in which a flat road portion changes to a downhill road portion; determine a first point at which the flat road portion changes to the uphill road portion or a second point at which the flat road portion changes to the downhill road portion; and based on the determination that the vehicle travels in the first section or in the second section of the road, control the display unit to display the image of the top view or the image of the bottom view at a predetermined distance ahead of the first point or the second point while the vehicle travels in the first section or in the second section.

In some implementations, the processor is configured to determine that the vehicle travels along a U-turn route; determine, from among front view images and rear view images included in the omnidirectional image and based on the determination that the vehicle travels along the U-turn route, an image of a region that corresponds to the U-turn route; and control the display unit to display the image of the region that corresponds to the U-turn route while the vehicle travels along the U-turn route.

In some implementations, the interface unit is configured to receive position information of the vehicle. The processor is configured to, based on the position information of the vehicle, control a size of the region in the omnidirectional image displayed on the display unit to adjust a field of view of the region.

In some implementations, the processor is configured to determine that the vehicle enters an intersection, an access road, or an exit; and control the size of the region in the omnidirectional image displayed on the display unit to expand the field of view of the region.

In some implementations, the interface unit is configured to receive vehicle speed information. The processor is configured to, based on the vehicle speed information, control a size of the region in the omnidirectional image displayed on the display unit to adjust a field of view of the region.

In some implementations, the interface unit is configured to receive turn signal information of the vehicle. The processor is configured to, based on the turn signal information of the vehicle, control a size of the region in the omnidirectional image displayed on the display unit to adjust a field of view of the region.

In another aspect, a vehicle includes an apparatus according to one or more of the foregoing implementations.

All or part of the features described throughout this application may be implemented as a computer program product including instructions that are stored on one or more non-transitory machine-readable storage media, and that are executable on one or more processing devices. All or part of the features described throughout this application may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

An apparatus for a vehicle is described herein that adaptively provides views of the surroundings of a vehicle. Although some vehicles may be provided with an around-view monitoring (AVM) apparatus that includes a plurality of cameras, such AVM apparatuses may only provide top-view images of the vehicle. Such top-view images may be limited in providing sufficient information about various situations in which the vehicle may operate.

Systems and techniques are disclosed herein that enable an apparatus that adaptively provides an around-view of a vehicle using at least one omnidirectional camera. The around-view is adapted to display a region around the vehicle that is matched to a state of the vehicle or surroundings of the vehicle.

In some implementations, the apparatus may provide a comprehensive view of surroundings of a vehicle through at least one omnidirectional camera, thus mitigating the presence of blind spots.

The apparatus may improve safe driving by adaptively providing images to a user that are appropriate for various driving conditions. For example, the images may be adaptively provided according to steering angle information or road tilt information of the vehicle, surroundings of the vehicle, or a driving situation of the vehicle, thereby improving safe driving.

A vehicle as described in this disclosure may include a car or a motorcycle, but implementations are not necessarily limited thereto, and may generally include any suitable vehicle that transports people. Hereinafter the description will be based on a car.

The vehicle described in this disclosure may include an internal combustion engine vehicle having an engine as a power source, a hybrid vehicle having an engine, an electric motor as a power source and an electric vehicle having an electric motor as a power source, or generally a vehicle that is motorized by any suitable power source.

In the following description, the left side of a vehicle refers to the left side in a driving direction of the vehicle and the right side of the vehicle refers to the right side in the driving direction of the vehicle.

Figure 1:
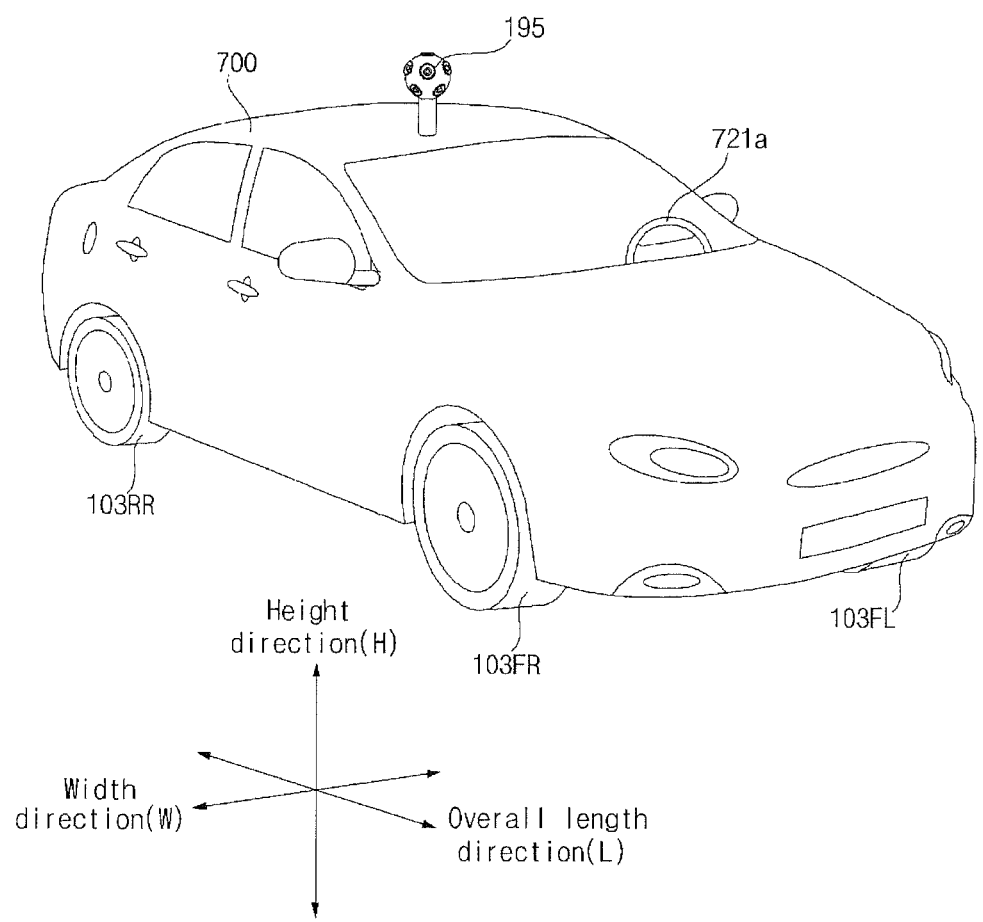
FIG. 1 is a diagram illustrating an example of an exterior of a vehicle.

FIG. 1 shows the exterior of a vehicle according to an implementation.

Referring to FIG. 1, a vehicle 700 may include wheels 103FR, 103FL and 103RR rotating by a power source, a steering input unit 721a configured to control steering of the vehicle 700 and an omnidirectional camera module 195 attached to the vehicle 700. While FIG. 1 shows that the omnidirectional camera module 195 is attached to the roof of the vehicle 700, the present disclosure is not limited thereto. The omnidirectional camera module 195 may be attached to any region of the body of the vehicle 700, such as the hood, front windshield, front bumper, rear windshield, trunk door, rear bumper, door, fender and side mirror.

The omnidirectional camera module 195 may acquire images of surroundings of the vehicle 700, captured at the position at which the omnidirectional camera module 195 is disposed. The images acquired by the omnidirectional camera module 195 may be processed in an apparatus 100 for providing an around view for a vehicle.

Two or more omnidirectional camera modules may be provided. According to an implementation, the number of omnidirectional camera modules may be two, three, four or more.

Figure 2A:
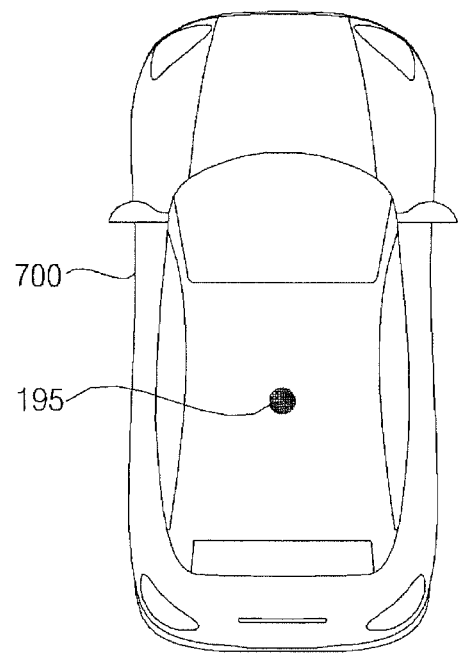
FIGS. 2A to 2C are diagrams illustrating examples of positions of cameras attached to a vehicle.
Figure 2B:
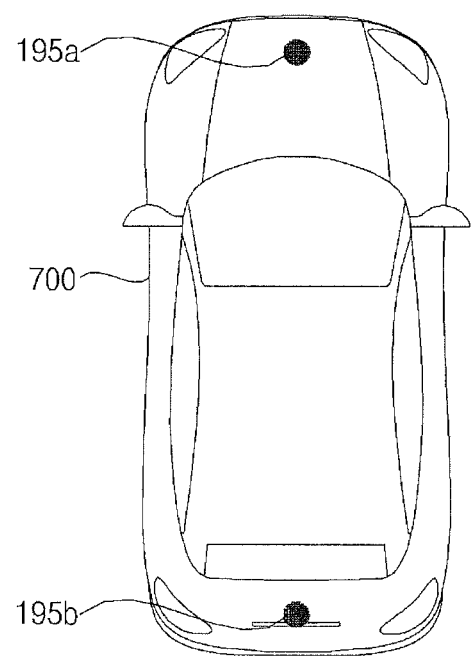
Figure 2C:
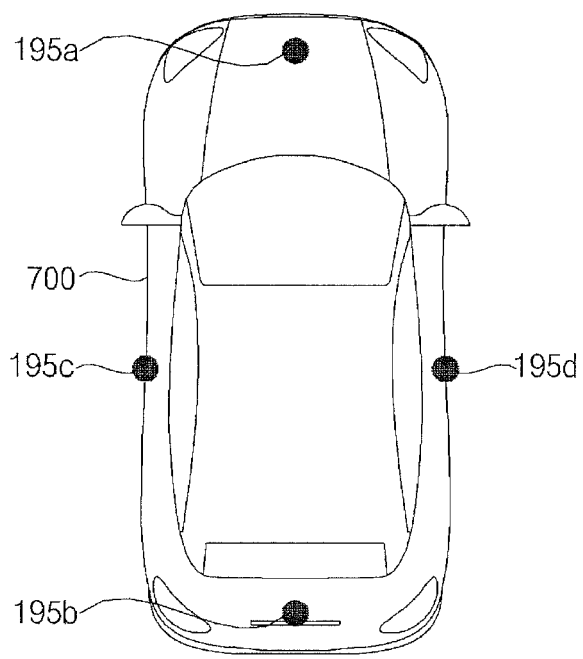

FIGS. 2A to 2C illustrate the positions of cameras attached to the vehicle according to implementations of the present disclosure.

Referring to FIG. 2A, the omnidirectional camera module 195 may be attached to the roof of the vehicle 700. The omnidirectional camera module 195 provided to the roof of the vehicle 700 acquires an omnidirectional image of the surroundings of the vehicle 700. For example, the omnidirectional camera module 195 acquires front view, rear view, left view, right view, bottom view and top view images of the vehicle 700.

A plurality of omnidirectional camera modules may be provided. Referring to FIG. 2B, a first omnidirectional camera module 195a may be provided to the front of the vehicle 700 and a second omnidirectional camera module 195b may be provided to the back of the vehicle 700. For example, the omnidirectional camera module 195a may be attached to a region of the hood or the front bumper of the vehicle 700 and the second omnidirectional camera module 195b may be attached to a region of the trunk or the rear bumper of the vehicle 700. When the multiple omnidirectional camera modules are arranged in this manner, blind spots covered by the body of the vehicle 700 may be reduced.

Referring to FIG. 2C, the first omnidirectional camera module 195a may be provided to the front of the vehicle 700, the second omnidirectional camera module 195b may be provided to the back of the vehicle 700, a third omnidirectional camera module 195c may be provided to the left side of the vehicle 700 and a fourth omnidirectional camera module 195d may be provided to the right side of the vehicle 700.

The first and second omnidirectional camera modules 195a and 195b may be arranged as described above with reference to FIG. 2B.

The third omnidirectional camera module 195c may be attached to one of the left front door, the left rear door, the left front fender, the left rear fender, the left side mirror, the left front wheel house and the left rear wheel house of the vehicle 700. The fourth omnidirectional camera module 195d may be attached to one of the right front door, the right rear door, the right front fender, the right rear fender, the right side mirror, the right front wheel house and the right rear wheel house of the vehicle 700. When multiple omnidirectional camera modules are arranged in this manner, blind spots covered by the body of the vehicle 700 may be further reduced.

Figure 3A:
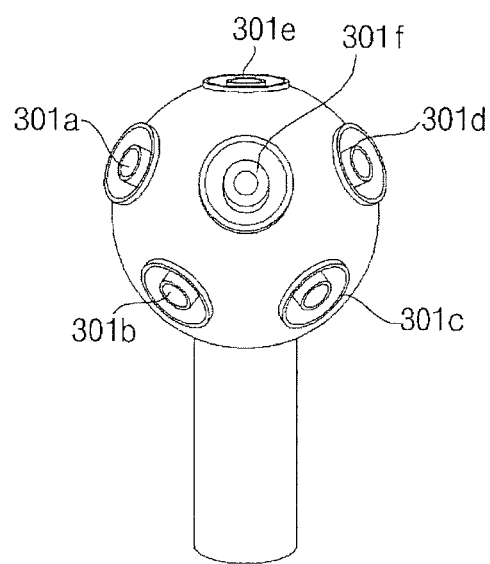
FIGS. 3A to 3C are diagrams illustrating examples of omnidirectional camera modules.
Figure 3B:
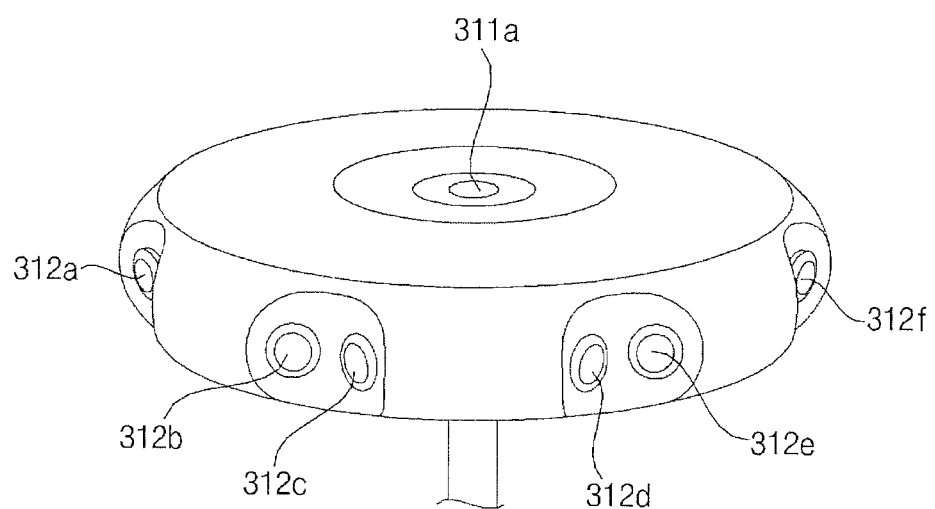
Figure 3C:
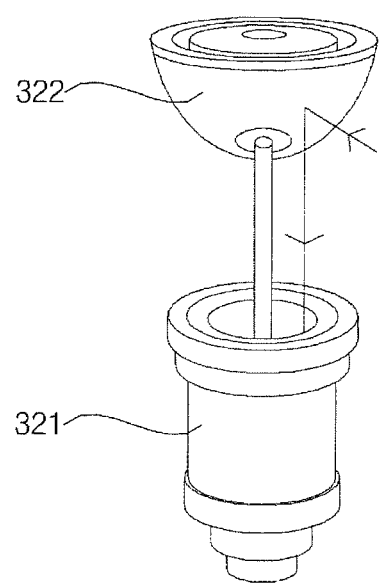

FIGS. 3A to 3C illustrate omnidirectional camera modules according to implementations of the present disclosure.

FIG. 3A illustrates an omnidirectional camera module 195 according to a first implementation.

Referring to FIG. 3A, the omnidirectional camera module 195 may include a plurality of cameras 301a, 301b, 301c, 301d, 301e and 301f. Each of the cameras 301a, 301b, 301c, 301d, 301e and 301f may include an image sensor (e.g., CCD or CMOS) and a lens. The cameras 301a, 301b, 301c, 301d, 301e and 301f may acquire images in multiple directions. The acquired images may be sent to a processor 170 and combined by the processor 170.

When the omnidirectional camera module 195 is provided to the vehicle 700, an omnidirectional image with respect to the vehicle 700 may be obtained through the cameras 301a, 301b, 301c, 301d, 301e and 301f. For example, the omnidirectional camera module 195 acquires images of a front view, a rear view, a left view, a right view, a bottom view and a top view of the vehicle 700.

The number and positions of the cameras 301a, 301b, 301c, 301d, 301e and 301f may be appropriately determined such that an omnidirectional image is acquired. The cameras 301a, 301b, 301c, 301d, 301e and 301f may have appropriate viewing angles such that images acquired by neighboring cameras overlap.

The processor 170 may combine all images acquired by the cameras 301a, 301b, 301c, 301d, 301e and 301f based on predetermined features detected from overlapping portions of the acquired images. For example, the processor 170 may detect a common feature from an overlapping portion of a first image acquired by the first camera 301a and a second image acquired by the second camera 301b. The processor 170 may combine the first image and the second image based on the detected feature. In this manner, the processor 170 generates an omnidirectional image by combining a plurality of images received from the plurality of cameras 301a, 301b, 301c, 301d, 301e and 301f.

FIG. 3B illustrates an omnidirectional camera module 195 according to a second implementation.

Referring to FIG. 3B, the omnidirectional camera module 195 may include a plurality of cameras 311a, 312a, 312b, 312c, 312d, 312e and 312f. Each of the cameras 311a, 312a, 312b, 312c, 312d, 312e and 312f may include an image sensor (e.g., CCD or CMOS) and a lens. The cameras 311a, 312a, 312b, 312c, 312d, 312e and 312f may acquire images in multiple directions. The acquired images may be sent to the processor 170 and combined by the processor 170.

When the omnidirectional camera module 195 is provided to the vehicle 700, an omnidirectional image with respect to the vehicle 700 may be obtained through the cameras 311a, 312a, 312b, 312c, 312d, 312e and 312f.

For example, the first camera 311a from among the plurality of cameras 311a, 312a, 312b, 312c, 312d, 312e and 312f acquire an image of a top view of the vehicle 700. In this case, it is desirable that the first camera 311a be a wide-angle camera. Cameras 312a, 312b, 312c, 312d, 312e and 312f other than the first camera 311a may acquire images of side views and a bottom view of the vehicle 700.

The image acquired by the first camera 311a may partially overlap with the images acquired by the other cameras 312a, 312b, 312c, 312d, 312e and 312f. The processor 170 may combine the images based on features detected from the overlapping portions.

In addition, the images acquired by the cameras 312a, 312b, 312c, 312d, 312e and 312f other than the first camera 311a may partially overlap. The processor 170 may combine the images based on features detected from the overlapping portions.

The processor 170 may generate an omnidirectional image by combining a plurality of images received from the plurality of cameras 311a, 312a, 312b, 312c, 312d, 312e and 312f.

FIG. 3C illustrates an omnidirectional camera module 195 according to a third implementation.

Referring to FIG. 3C, the omnidirectional camera module 195 may include a camera 321 and a parabolic mirror 322. The camera 321 may include an image sensor (e.g., CCD or CMOS) and a lens.

The camera 321 may acquire an image reflected by the parabolic mirror 322. Here, the image may be an omnidirectional image.

Figure 4:
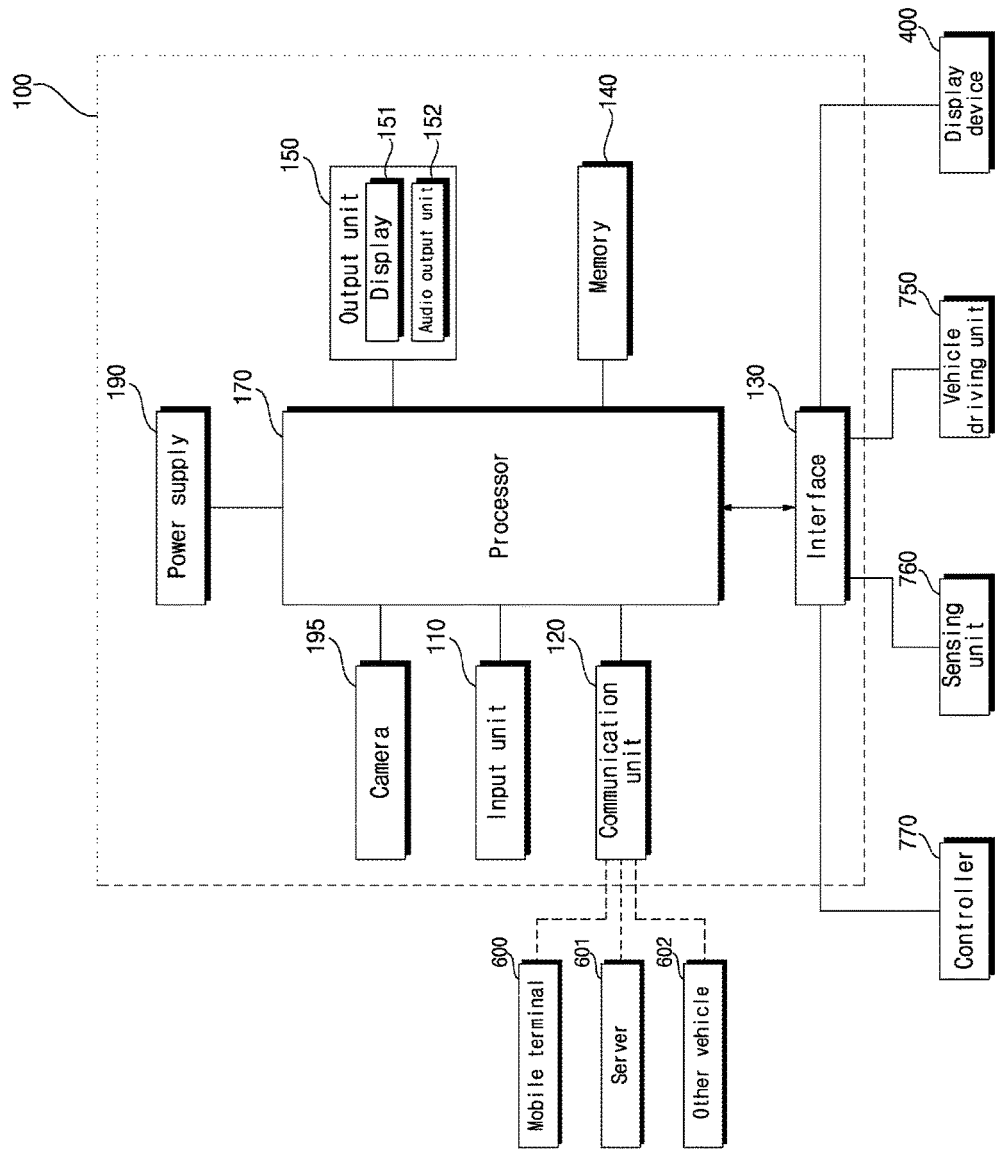
FIG. 4 is a block diagram illustrating an example of an apparatus that provides an around-view for a vehicle.

FIG. 4 is a block diagrams of an apparatus for providing an around view for a vehicle according to an implementation.

Referring to FIG. 4, the apparatus 100 for providing an around view may include an input unit 110, a communication unit 120, an interface 130, a memory 140, an output unit 150, the processor 170, a power supply unit 190 and the omnidirectional camera module 195.

The input unit 110 may include a plurality of buttons or a touchscreen. The apparatus 100 for providing an around view may be powered on to operate through the plurality of button or the touchscreen. In addition, various input operations may be performed through the input unit 110. According to an implementation, the input unit 110 may include an audio input unit for receiving user voice input. In this case, the audio input unit may include a microphone for converting user voice to an electrical signal.

The communication unit 120 may exchange data with a mobile terminal 600, a server 601 or another vehicle 602. Particularly, the communication unit 120 may exchange data with a mobile terminal of a driver of the vehicle through a wireless communication scheme. Various data communication schemes such as Bluetooth, Wi-Fi Direct, Wi-Fi, APiX and NFC may be used as the wireless communication scheme.

The communication unit 120 may receive weather information and traffic information, for example, TPEG (Transport Protocol Expert Group) information from the mobile terminal 600 or the server 601. The apparatus 100 for providing an around view may transmit real-time information obtained thereby to the mobile terminal 600 or the server 601.

When the user rides in the vehicle, the mobile terminal 600 of the user and the apparatus 100 for providing an around view may be paired automatically or according to execution of an application by the user.

The communication unit 120 may receive traffic light change information from the external server 601. Here, the external server 601 may be a server installed in a traffic control center.

The interface 130 may receive vehicle related data or transmit signals processed or generated by the processor 170 to external devices. To this end, the interface 130 may perform data communication with a controller 770, a vehicle display device 400, a sensing unit 760 and a vehicle-driving unit 750 of the vehicle.

The interface 130 may receive navigation information through data communication with the controller 770, the vehicle display device 400 or a separate navigation system. Here, the navigation information may include information on a set destination, route information with respect to the destination, map information related to vehicle driving and current vehicle location information. The navigation information may include information on the location of the vehicle on a road.

The interface 130 may receive sensor information from the controller 770 or the sensing unit 760 or from any suitable source of sensor information.

In some implementations, the sensor information may include at least one of vehicle direction information, vehicle location information (GPS information), vehicle angle information, vehicle speed information, vehicle acceleration information, vehicle tilting information, information on forward/backward movement of the vehicle, battery information, fuel information, tire information, vehicle lamp information, vehicle internal temperature information, vehicle internal humidity information, or information on rain.

Such sensor information may be acquired from a heading sensor, a yaw sensor, a gyro sensor, a position module, a vehicle front/rear sensor, a wheel sensor, a vehicle speed sensor, a car body tilting sensor, a battery sensor, a fuel sensor, a tire sensor, a steering sensor according to steering wheel rotation, a vehicle internal temperature sensor, a vehicle internal humidity sensor and a rain sensor.

From among the sensor information, the vehicle direction information, vehicle location information, vehicle angle information, vehicle speed information and vehicle tilting information, which are related to driving of the vehicle, may be referred to as driving information.

The interface 130 may provide a signal to the controller 770 or to the vehicle-driving unit 750. The signal may be a control signal. For example, the processor 170 provides a control signal for acceleration to a power source driver 751 (shown in FIG. 7). As another example, the processor 170 provides a steering control signal to a steering driver 752 (shown in FIG. 7) through the interface 130. As yet another example, the processor 170 provides a control signal for deceleration to a brake driver 753 (shown in FIG. 7) through the interface 130.

The interface 130 may receive steering angle information from a steering angle sensor included in the sensing unit 760 of the vehicle 700.

The interface 130 may receive position information of the vehicle from a GPS sensor included in the sensing unit 760 of the vehicle 700 or a position information module 714 included in a communication unit 710 of the vehicle 700.

The interface 130 may receive vehicle speed information from a vehicle speed sensor included in the sensing unit 760 of the vehicle 700.

The interface 130 may receive turn signal information from the controller 770 of the vehicle 700. For example, the interface 130 may be provided with left or right turn signal on information according to operation of a driver.

The memory 140 may store data for overall operation of the apparatus 100 for providing an around view, such as a processing or control program of the processor 170.

The memory 140 may store data for object identification. For example, the memory 140 stores data for identifying a predetermined object according to a predetermined algorithm when the predetermined object is detected from an image acquired through the omnidirectional camera module 195.

The memory 140 may store data about traffic information. For example, the memory 140 stores data for identifying predetermined traffic information according to a predetermined algorithm when the traffic information is detected from an image acquired by the cameras 195.

The memory 140 may be various storage devices such as a ROM, a RAM, an EPROM, a flash drive and a hard drive.

The output unit 150 may include a display 151 and an audio output unit 152.

The display 151 may display information processed by the processor 170. The display 151 may display an image related to operation of the apparatus 100 for providing an around view.

The display 151 may display an around view image generated by the processor 170. When the display 151 displays the around view image, the display 151 may provide various user interfaces and may include a touch sensor through which touch input for a provided user interface is applied.

The display 151 may be implemented such that an image is displayed on the room mirror, the side mirror or the side window glass of the vehicle 700.

For example, the display 151 may be provided to the room mirror or the side mirror. In this case, the display 151 may function as a mirror and display an image when a predetermined event is generated.

As another example, the display 151 may be implemented as a transparent display and provided in proximity to the side window glass. Alternatively, the display 151 may include a projection module which projects an image onto the side window glass.

The display 151 may be implemented to display an image on a front windshield.

For example, the display 151 may be implemented as a transparent display and provided in proximity to the front windshield. Alternatively, the display 151 may include a projection module which projects an image onto the front windshield.

The audio output unit 152 may output a sound based on an audio signal processed by the processor 170. To this end, the audio output unit 152 may include at least one speaker.

The processor 170 controls overall operation of each unit included in the apparatus 100 for providing an around view.

The processor 170 may process an around view image of the vehicle, acquired by the camera module 195. Particularly, the processor 170 may perform computer vision based signal processing. The processor 170 may perform object detection and object tracking. Particularly, the processor 170 may perform lane detection (LD), vehicle detection (VD), pedestrian detection (PD), brightspot detection (BD), traffic sign recognition (TSR), road surface detection and the like during object detection.

The processor 170 may detect information from an around view image of the vehicle, acquired by the camera module 195.

The information may be information about a driving situation of the vehicle. For example, the information may include information about a road on which the vehicle travels, traffic regulation information, information on neighboring vehicles, information on vehicle or pedestrian traffic lights, construction information, traffic condition information, parking lot information, lane information, and the like.

The processor 170 may identify the detected information by comparing the detected information with information stored in the memory 140.

The processor 170 may receive weather information and traffic condition information, e.g., TPEG information, through the communication unit 120.

The processor 170 may detect information on traffic conditions around the vehicle, detected on the basis of an image, in real time in the apparatus 100 for providing an around view.

The processor 170 may receive navigation information from the vehicle display device 400 or a separate navigation system through the interface 130.

The processor 170 may receive sensor information from the controller 770 or the sensing unit 760 through the interface 130. Here, the sensor information may include at least one of vehicle direction information, vehicle location information (GPS information), vehicle angle information, vehicle speed information, vehicle acceleration information, vehicle tilting information, information on forward/backward movement of the vehicle, battery information, fuel information, tire information, vehicle lamp information, vehicle internal temperature information, vehicle internal humidity information and steering wheel rotation information.

The processor 170 may be provided with steering angle information or vehicle tilt information through the interface 130. The processor 170 may generate an omnidirectional image based on images of the surroundings of the vehicle, which are acquired by the omnidirectional camera module 195. Here, the omnidirectional image may be an image of the entire space surrounding the vehicle 700.

For example, the processor 170 may compose images based on features of overlap regions of images acquired by a plurality of cameras included in the omnidirectional camera module 195. In some implementations, the processor 170 may detect common features of overlap regions of a first image acquired by a first camera from among the plurality of cameras and a second image acquired by a second camera. The processor 170 may combine the first image and the second image based on the common features. In this manner, the processor 170 may generate an omnidirectional image by combining a plurality of images acquired by the plurality of cameras.

Some around-view monitoring (AVM) apparatuses may acquire a front view image, a rear view image, a left view image, and a right view image using four cameras. Such AVM apparatuses may combine the acquired images to provide an around-view image. For example, the around view image may be a top view image. A camera used in such an AVM apparatus has a predetermined view angle and acquires an image of a road surface around the corresponding vehicle. In this case, only limited information about the surroundings of the vehicle is provided.

According to some implementations described herein, the apparatus 100 for providing an around-view may provide an omnidirectional image based on images of the surroundings of the vehicle, acquired through the omnidirectional camera module 195. Accordingly, the apparatus 100 for providing an around view according to an implementation may acquire and provide information about a wider area.

The processor 170 may control an image of a region matched to the steering angle information or tilt information, in the omnidirectional image, to be displayed through the display 151.

When the vehicle 700 is driven forward, the processor 170 may control an image of a region matched to the steering angle information or tilt information, from among front view images included in the omnidirectional image, to be displayed on the display 151.

The processor 170 may control an image of the left or right side of the vehicle 700 when driven forward based on the omnidirectional camera module 195 to be displayed on the display 151 according to the steering angle information.

The processor 170 may control an image of a top view or bottom view of the vehicle 700 when driven forward based on the omnidirectional camera module 195 to be displayed on the display 151 according to the tilt information.

The vehicle 700 may travel in a section in which a flat road changes to an uphill road. In this case, the processor 170 may detect a point at which the flat road and the uphill road meet by processing images acquired through the omnidirectional camera module 195. Here, the point at which the flat road and the uphill road meet may be referred to as an inflection point. The processor 170 may control an image of a top view of the vehicle 700 driven forward to be displayed on the display 151 a predetermined distance ahead of the inflection point.

The vehicle 700 may travel in a section in which a flat road changes to a downhill road. In this case, the processor 170 may detect a point at which the flat road changes to the downhill road by processing images acquired through the omnidirectional camera module 195. Here, the point at which the flat road changes to the downhill road may be referred to as an inflection point. The processor 170 may control an image of a bottom view of the vehicle 700 driven forward to be displayed on the display 151 a predetermined distance ahead of the inflection point.

When the vehicle 700 is driven backward, the processor 170 may control an image of a region matched to the steering angle information or tilt information, from among rear view images included in the omnidirectional image, to be displayed on the display 151.

The processor 170 may control an image of the left or right side of the vehicle 700 when driven backward based on the omnidirectional camera module 195 to be displayed on the display 151 according to the steering angle information.

The processor 170 may control an image of a top view or bottom view of the vehicle 700 when driven backward based on the omnidirectional camera module 195 to be displayed on the display 151 according to the tilt information.

The vehicle 700 may travel in a section in which a flat road changes to an uphill road. In this case, the processor 170 may detect a point at which the flat road changes to the uphill road by processing images acquired through the omnidirectional camera module 195. Here, the point at which the flat road changes to the uphill road may be referred to as an inflection point. The processor 170 may control an image of a top view of the vehicle 700 driven backward to be displayed on the display 151 a predetermined distance ahead of the inflection point.

The vehicle 700 may travel in a section in which a flat road changes to a downhill road. In this case, the processor 170 may detect a point at which the flat road and the downhill road meet by processing images acquired through the omnidirectional camera module 195. Here, the point at which the flat road and the downhill road meet may be referred to as an inflection point. The processor 170 may control an image of a bottom view of the vehicle 700 driven backward to be displayed on the display 151 a predetermined distance ahead of the inflection point.

When the vehicle 700 makes a U-turn, the processor 170 may control an image of a region matched to the U-turn route of the vehicle 700, from among front view images and rear view images included in the omnidirectional image, to be displayed.

The processor 170 may receive position information of the vehicle 700 through the interface 130. The processor 170 may control the size of a region of the omnidirectional image, which is displayed on the display 151, in response to the position information of the vehicle 700.

For example, when the vehicle 700 enters an intersection, an access road or an exit, the processor 170 may control the region of the omnidirectional image, which is displayed on the display 151, to be extended. In this case, the processor 170 may control the region of the omnidirectional image, which is displayed on the display 151, to be extended from the region displayed on the display 151 when the vehicle 700 is driven on a general road. Accordingly, it is possible to provide images and information to the driver such that the driver can secure a wider view when entering an intersection, an access road or an exit, thereby enabling safe driving.

Whether the vehicle enters an intersection, an access road or an exit may be determined based on of the position information of the vehicle.

The processor 170 may receive speed information of the vehicle 700 through the interface 130. The processor 170 may control the size of the region of the omnidirectional image, which is displayed on the display 151, in response to the speed information. For example, the size of the region may be adaptively changed to increase or decrease a field of view of the region, thus providing a user with a broader or narrow field of view in one or more directions around the vehicle based on the vehicle speed.

When the vehicle 700 travels at a low speed (e.g., when the vehicle 700 travels downtown), the driver needs to check a wide area within a distance from the vehicle 700 with the naked eye. When the vehicle 700 travels at a high speed (e.g., when the vehicle 700 travels on an expressway), the driver needs to check a long distance in a narrow area with the naked eye. The processor 170 may control the size of the region of the omnidirectional image, which is displayed on the display 151, in response to the vehicle speed, thereby providing information suitable for the vehicle speed to the driver during low-speed or high-speed driving.

The processor 170 may receive turn signal information through the interface 130. The processor 170 may control the size of the region of the omnidirectional image, which is displayed on the display 151, in response to the turn signal information.

Since steering control is performed after input of a turn signal, it is possible to provide appropriate information to the driver by controlling the region of the omnidirectional image, which is displayed on the display 151, in response to the turn signal information.

The power supply unit 190 may supply power necessary to operate each component under the control of the processor 170. Particularly, the power supply unit 190 may be provided with power from a battery in the vehicle.

The omnidirectional camera module 195 may be attached to one region of the vehicle. It is desirable that the omnidirectional camera module 195 be attached to part of the body of the vehicle. For example, the omnidirectional camera module 195 may be attached to the roof, the hood or the trunk of the vehicle.

A plurality of omnidirectional camera modules 195 may be provided.

The omnidirectional camera module 195 may acquire images of the surroundings of the vehicle. Here, the images of the surroundings of the vehicle may be omnidirectional images of the surroundings of the vehicle. For example, the omnidirectional camera module 195 may acquire a front view image, a rear view image, a left view image, a right view image, a bottom view image and a top view image of the vehicle. To acquire omnidirectional images of the surroundings of the vehicle, the omnidirectional camera module 195 may include a plurality of cameras.

The omnidirectional camera module 195 may include the first omnidirectional camera module 195*a* and the second omnidirectional camera module 195*b*.

The first omnidirectional camera module 195*a* may be attached to the front of the vehicle so as to acquire an omnidirectional image of a front view of the vehicle. For example, the first omnidirectional camera module 195*a* may be attached to the hood of the vehicle. The first omnidirectional camera module 195*a* may acquire an omnidirectional image at the position thereof.

The second omnidirectional camera module 195*b* may be attached to the backside of the vehicle so as to acquire an omnidirectional image of a rear view of the vehicle. For example, the second omnidirectional camera module 195b may be attached to the trunk or the rear end of the roof of the vehicle. The second omnidirectional camera module 195b may acquire an omnidirectional image at the position thereof.

The omnidirectional camera module 195 has been described with reference to FIGS. 3A to 3C.

Figure 5A:
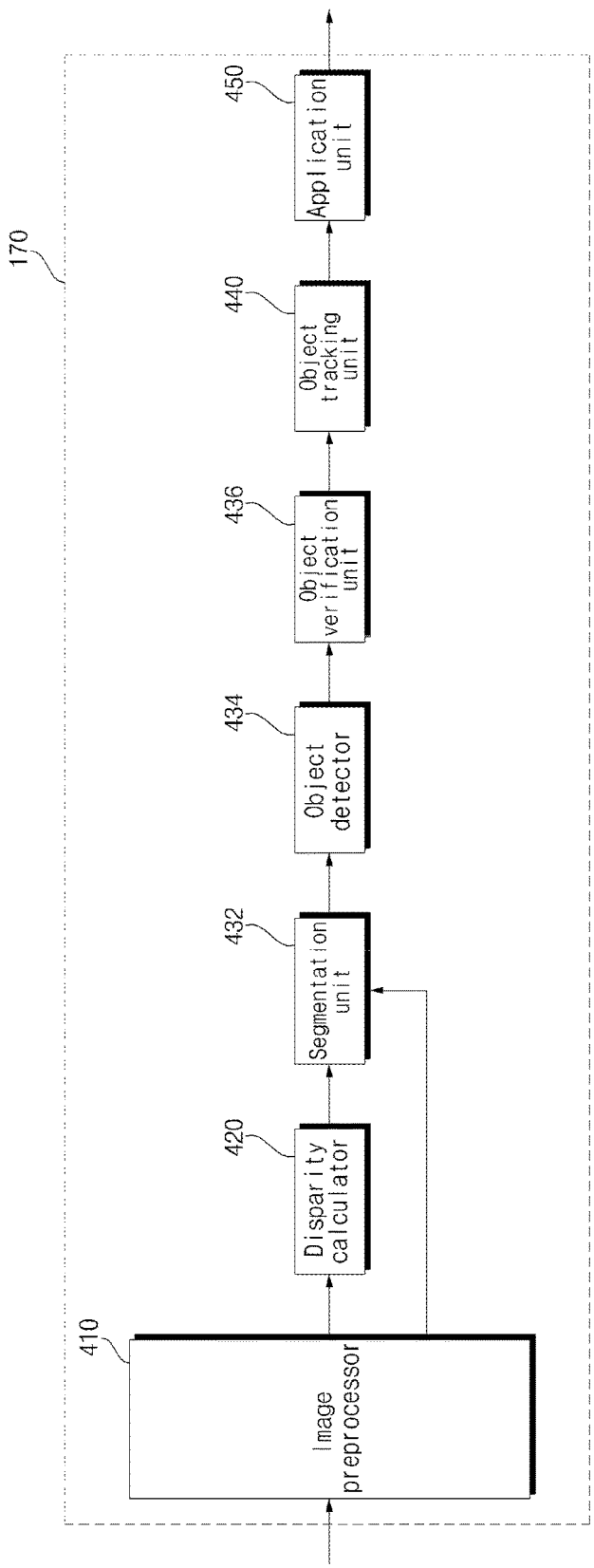
FIGS. 5A and 5B are block diagrams illustrating examples of a processor shown in FIG. 4.
Figure 5B:
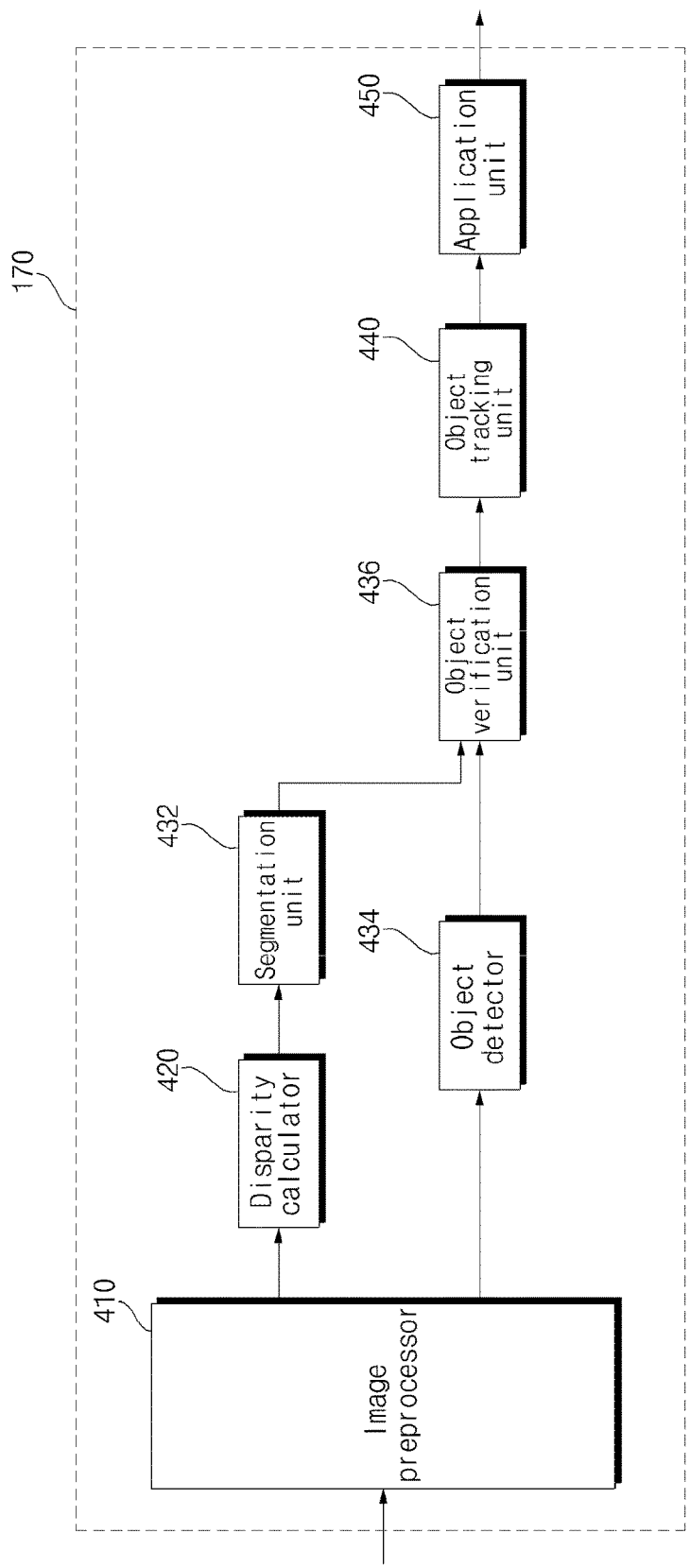
Figure 5C:
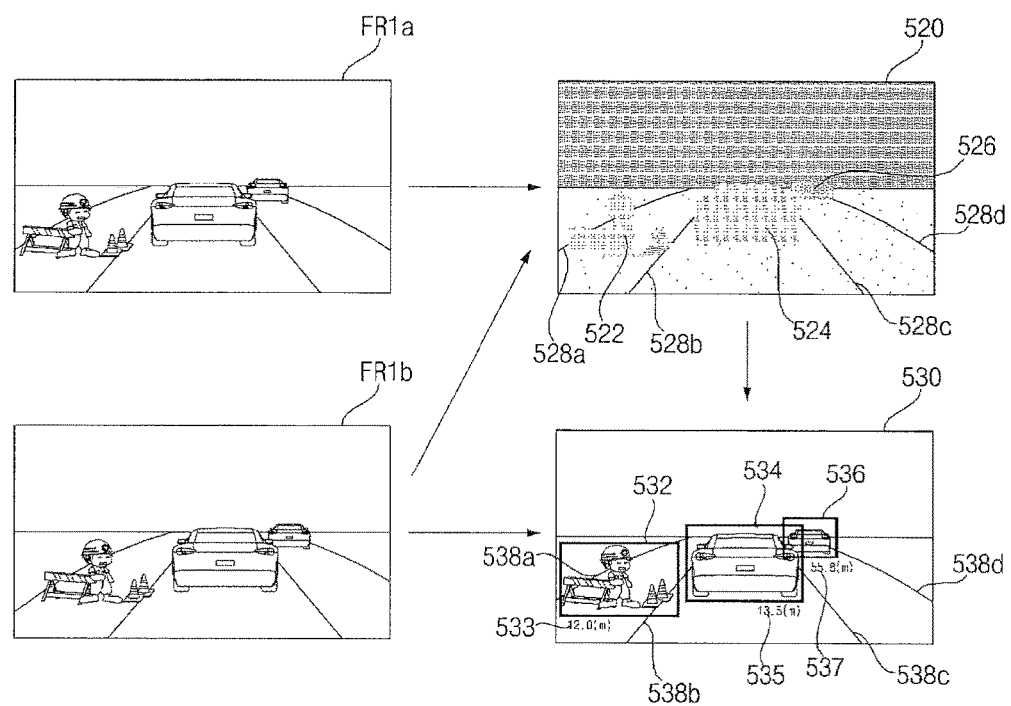
FIG. 5C is a diagram illustrating an example of object detection performed by the processor shown in FIGS. 5A and 5B.

FIGS. 5A and 5B are block diagrams of the processor shown in FIG. 4 and FIG. 5C illustrates object detection performed by the processor of FIGS. 5A and 5B.

FIG. 5A is a block diagram of the processor 170. Referring to FIG. 5A, the processor 170 of the apparatus 100 for proving an around view for a vehicle may include an image pre-processor 410, a disparity calculator 420, a segmentation unit 432, an object detector 434, an object verification unit 436, an object tracking unit 440 and an application unit 450.

The image pre-processor 410 may receive a plurality of images or a generated around view image from the plurality of cameras 195a to 195d and pre-process the images or the around view image.

Specifically, the image pre-processor 410 may perform noise reduction, rectification, calibration, color enhancement, color space conversion (CSC), interpolation and camera gain control on the plurality of images or the generated around view image. Accordingly, it is possible to obtain an image clearer than the images acquired by the plurality of cameras 195a to 195d or the generated around view image.

The disparity calculator 420 may receive the plurality of images or the around view image preprocessed by the image preprocessor 410, perform stereo matching on the plurality of images sequentially received for a predetermined time or the generated around view image and obtain a disparity map according to stereo matching. For example, disparity information about the surroundings of the vehicle may be obtained.

Stereo matching may be performed per pixel of the images or in units of predetermined blocks. The disparity map may refer to a map that shows binocular parallax information of images, For example, left and right images, as numerical values.

The segmentation unit 432 may perform segmentation and clustering on the images based on the disparity information from the disparity calculator 420.

Specifically, the segmentation unit 432 may separate a background and a foreground from at least one of the images based on the disparity information.

For example, a region having disparity information less than a predetermined value in a disparity map may be calculated as a background and excluded. Accordingly, a foreground may be relatively separated.

As another example, a region having disparity information that exceeds the predetermined value in the disparity map may be calculated as a foreground and extracted. Accordingly, the foreground may be separated.

As described above, a foreground and a background may be separated on the basis of disparity information extracted based on an image so as to increase a signal processing rate and to decrease signal processing quantity during the following object detection.

The object detector 434 may detect an object based on image segments from the segmentation unit 432.

For example, the object detector 434 may detect an object for at least one image based on disparity information.

Specifically, the object detector 434 may detect an object for at least one image. For example, the object detector 434 may detect an object from a foreground separated through image segmentation.

The object verification unit 436 classifies and verifies separated objects.

To this end, the object verification unit 436 may use an identification method using a neural network, SVM (Support Vector Machine) scheme, an identification method according to AdaBoost using Haar-like features, HOG (Histograms of Oriented Gradients) or the like.

The object verification unit 436 may compare objects stored in the memory 140 with detected objects to verify the detected objects.

For example, the object verification unit 436 verifies neighboring vehicles, lanes, road surfaces, signs, dangerous areas and tunnels around the vehicle.

The object tracking unit 440 tracks verified objects. For example, the object-tracking unit 440 may verify an object included in sequentially acquired images, calculate the motion or motion vector of the verified object and track movement of the object based on the calculated motion or motion vector of the object. Accordingly, the object-tracking unit 440 may track neighboring vehicles, lanes, road surfaces, signs, dangerous areas and the like around the vehicle.

FIG. 5B is a block diagram of the processor according to another implementation.

Referring to FIG. 5B, the processor 170 has the same internal components as the processor 170 shown in FIG. 5A but differs from the processor 170 of FIG. 5A with respect to signal processing order. A description will be given of only the difference.

The object detector 434 may receive a plurality of images or a generated around view image and detect objects included in the plurality of images or the generated around view image. The object detector 434 may directly detect objects from the plurality of images or the generated around view image rather than detecting objects for segmented images on the basis of disparity information, distinguished from FIG. 5A.

The object verification unit 436 classifies and verifies detected and separated objects based on image segments from the segmentation unit 432 and the objects detected by the object detector 434.

To this end, the object verification unit 436 may use an identification method using a neural network, SVM, an identification method according to AdaBoost using Haar-like feature, HOG or the like.

FIG. 5C is a view for explaining operation of the processor 170 on the basis of images respectively acquired in first and second frame periods.

Referring to FIG. 5C, the plurality of cameras 195a to 195d sequentially acquire images FR1a and FR1b for the first and second frame periods.

The disparity calculator 420 of the processor 170 receives the images FR1a and FR1b processed by the image pre-processor 410 and performs stereo matching on the received images FR1a and FR1b to obtain a disparity map 520.

The disparity map 520 represents the binocular parallax between the images FR1a and FR1b as levels. A higher disparity level represents a shorter distance to the vehicle and a lower disparity level represents a longer distance to the vehicle.

The display map may be displayed such that a higher disparity level corresponds to higher luminance and a lower disparity level corresponds to lower luminance.

FIG. 5C shows that first to fourth lanes 528a, 528b, 528c and 528d respectively have disparity levels corresponding thereto and a construction area 522, a first preceding vehicle 524 and a second preceding vehicle respectively have disparity levels corresponding thereto in the disparity map 520.

The segmentation unit 432, the object detector 434 and the object verification unit 436 respectively perform segmentation, object detection and object verification on at least one of the images FR1a and FR1b based on the disparity map 520.

FIG. 5C illustrates object detection and verification for the second image FR1b using the disparity map 520.

For example, first to fourth lanes 538a, 538b, 538c and 538d, a construction area 532, a first preceding vehicle 534 and a second preceding vehicle 536 in an image 530 may be detected and verified.

The object-tracking unit 440 may track verified objects by continuously acquiring images.

Figure 6:
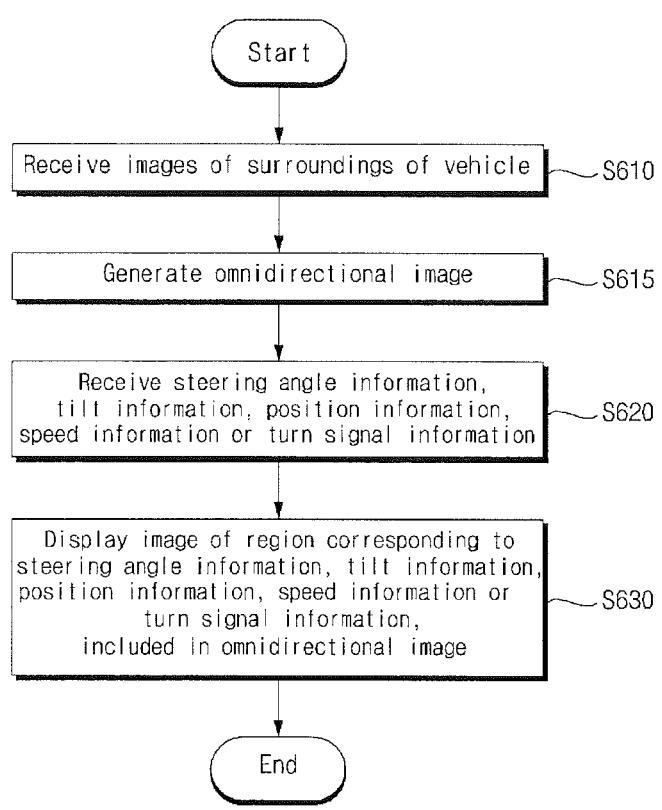
FIG. 6 is a flowchart illustrating an example of an operation of an apparatus that provides an around-view for a vehicle.

FIG. 6 is a flowchart illustrating operation of the apparatus for providing an around view according to an implementation.

Referring to FIG. 6, the processor 170 may receive images of the surroundings of the vehicle from the omnidirectional camera module 195 (S610).

The processor 170 may generate an omnidirectional image based on the received images (S615). Here, the omnidirectional image may be images of the entire space surrounding the vehicle 700.

Subsequently, the processor 170 may receive steering angle information, vehicle tilt information, vehicle position information, vehicle speed information or turn signal information through the interface 130 (S620).

The processor 170 may display an image of a region of the omnidirectional image, which corresponds to the steering angle information, vehicle tilt information, vehicle position information, vehicle speed information or turn signal information (S630).

Figure 7:
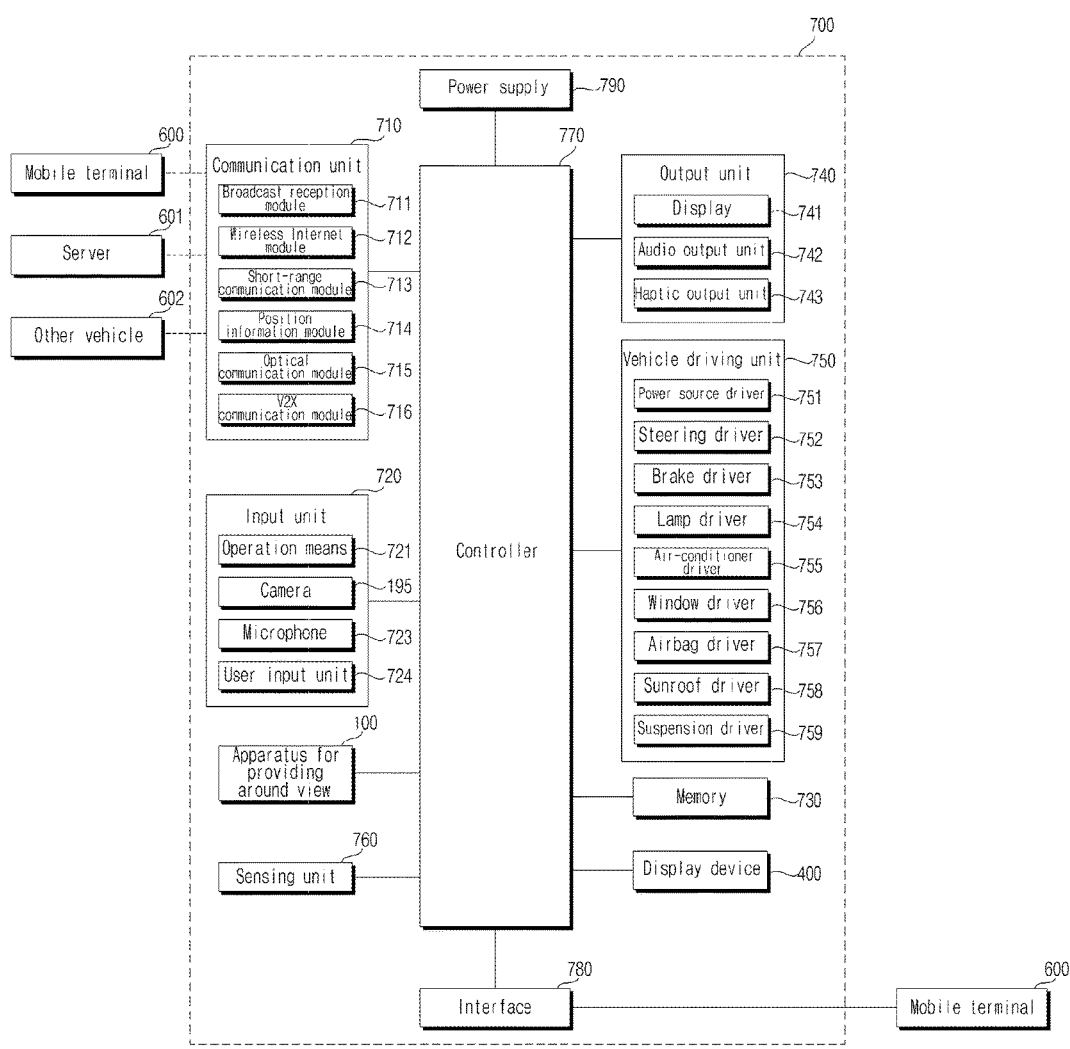
FIG. 7 is a block diagram illustrating an example of a vehicle.

FIG. 7 is a block diagram of the vehicle according to an implementation.

Referring to FIG. 7, the vehicle 700 may include the communication unit 710, an input unit 720, the sensing unit 760, an output unit 740, the vehicle driving unit 750, a memory 730, an interface 780, a controller 770, a power supply 790, the apparatus 100 for parking a vehicle and the vehicle display device 400.

The communication unit 710 may include one or more modules for enabling wireless communication between the vehicle 700 and the mobile terminal 600, between the vehicle 700 and the external server 601 or between the vehicle 700 and another vehicle 602. In addition, the communication unit 710 may include one or more modules for linking the vehicle 700 to one or more networks.

The communication unit 710 may include a broadcast reception module 711, a wireless Internet module 712, a short-range communication module 713, a position information module 714, an optical communication module 715 and a V2X communication module 716.

The broadcast reception module 711 receives broadcast signals or broadcast related information from an external broadcast management server through broadcast channels. Here, broadcast includes radio broadcast and TV broadcast.

The wireless Internet module 712 refers to a module for wireless Internet access and may be embedded in the vehicle 700 or provided to the outside of the vehicle 700. The wireless Internet module 712 is configured to transmit and receive radio signals in communication networks according to wireless Internet technologies.

The wireless Internet technologies include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced) and the like, and the wireless Internet module 712 transmits and receives data according to at least one of wireless Internet technologies including those not above-mentioned. For example, the wireless Internet module 712 may wirelessly exchange data with the external server 601. The wireless Internet module 712 may receive weather information and traffic information (e.g., TPEG (Transport Protocol Expert Group) information) from the external server 601.

The short-range communication module 713 is a module for short range communication and may support short range communication using at least one of Bluetooth™, RFID (Radio Frequency Identification), Infrared Data Association (IrDA), UWB (Ultra-Wideband), ZigBee, NFC (Near Field Communication), Wi-Fi (Wireless-Fidelity), Wi-Fi Direct and Wireless USB (Wireless Universal Serial Bus).

The short-range communication module 713 may perform short-range communication between the vehicle 700 and at least one external device by establishing wireless area networks. For example, the short-range communication module 713 may exchange data with the mobile terminal 600. The short-range communication module 713 may receive weather information and traffic information (e.g., TPEG information) from the mobile terminal 600. When the user gets in the vehicle 700, the mobile terminal 600 of the user and the vehicle 700 may be paired automatically or according to execution of an application by the user.

The position information module 714 is a module for acquiring the location of the vehicle 700 and a typical example thereof is a GPS (Global Positioning System) module. For example, the vehicle may acquire the location thereof using signals sent from a GPS satellite using the GPS module.

The optical communication module 715 may include a light transmission unit and a light receiving unit. The light receiving unit converts a light signal into an electrical signal so as to receive information. The light receiving unit may include a photodiode (PD) for receiving light. The photodiode converts light into an electrical signal. For example, the light receiving unit may receive information on a preceding vehicle through light emitted from a light source included in the preceding vehicle.

The light transmission unit may include at least one light-emitting element for converting an electrical signal into a light signal. Here, the light-emitting element is preferably an LED (Light Emitting Diode). The light transmission unit converts an electrical signal into a light signal and emits the light signal. For example, the light transmission unit may emit a light signal through flickering of the light-emitting element, which corresponds to a predetermined frequency. According to an implementation, the light transmission unit may include a plurality of light-emitting element arrays. According to an implementation, the light transmission unit may be integrated with a lamp provided to the vehicle 700. For example, the light transmission unit may be at least one of a headlight, a taillight, a brake light, a turn signal lamp, or a sidelight. For example, the optical transmission module 715 may exchange data with the other vehicle 602 through optical communication.

The V2X communication module 716 is a module for wireless communication between the vehicle 700 and the external server 601 or the other vehicle 602. The V2X module 716 includes a module in which a vehicle-to-vehicle communication (V2V) or vehicle-to-infrastructure communication (V2I) protocol may be implemented. The vehicle 700 may perform wireless communication with the external server 601 or the other vehicle 602 through the V2X communication module 716.

The input unit 720 may include an operation unit 721, the camera 195, a microphone 723 and a user input unit 724.

The operation unit 721 receives user input for driving the vehicle 700. The operation unit 721 may include a steering input unit 721$a$, a shift input unit 721$b$, an acceleration input unit 721$c$ and a brake input unit 721$d$.

The user applies steering input to the steering input unit 721$a$. The steering input unit 721$a$ is preferably configured in the form of a wheel such that steering input may be applied according to rotation. According to an implementation, the steering input unit 721$a$ may be configured as a touchscreen, a touch pad or a button.

The user applies inputs with respect to park (P), drive (D), neutral (N), reverse (R) of the vehicle 700 through the shift input unit 721$b$. The shift input unit 721$b$ is preferably configured in the form of a lever. According to an implementation, the shift input unit 721$b$ may be configured in the form of a touchscreen, a touch pad or a button.

The user applies input with respect to acceleration of the vehicle 700 through the acceleration input unit 721$c$. The user applies input with respect to reduction of the speed of the vehicle 700 to the brake input unit 721$d$. The acceleration input unit 721$c$ and the brake input unit 721$d$ are preferably configured in the form of a pedal. According to an implementation, the acceleration input unit 721$c$ or the brake input unit 721$d$ may be configured in the form of a touchscreen, a touch pad or a button.

The camera 195 may include an image sensor and an image-processing module. The camera 195 may process still images or video acquired through the image sensor (e.g., CMOS or CCD). The image-processing module may process still images or video acquired through the image sensor to extract necessary information and transmit the extracted information to the controller 770. The vehicle 700 may include the camera 195 for photographing a front view image or an around view image of the vehicle and an internal camera for photographing the inside of the vehicle.

The internal camera may acquire an image of a person who enters the vehicle. The internal camera may acquire an image for biometrics of the person.

While FIG. 7 shows that the camera 195 is included in the input unit 720, the camera 195 may be included in the apparatus 100 for providing an around view as described above with reference to FIGS. 1 to 7.

The microphone 723 may process an external audio signal into electrical data. The processed data may be used in various manners according to functions executed in the vehicle 700. The microphone 723 may convert a voice command of the user into electrical data. The converted electrical data may be transmitted to the controller 770.

According to an implementation, the camera 195 or the microphone 723 may be included in the sensing unit 760 instead of the input unit 720.

The user input unit 724 is used to receive information from the user. Upon input of information through the user input unit 724, the controller 770 may control operation of the vehicle 700 to respond to the input information. The user input unit 724 may include a touch type input unit or a mechanical input unit. According to an implementation, the user input unit 724 may be provided to a region of the steering wheel of the vehicle. In this case, the driver may operate the user input unit 724 with a finger while gripping the steering wheel.

The sensing unit 760 senses signals related to driving of the vehicle 700 and the like. To this end, the sensing unit 760 may include a collision sensor, a wheel sensor, a speed sensor, a tilt sensor, a weight sensor, a heading sensor, a yaw sensor, a gyro sensor, a position module, a front side/rear side sensor, a battery sensor, a fuel sensor, a tire sensor, a steering sensor, a vehicle internal temperature sensor, a vehicle internal humidity sensor, an ultrasonic sensor, radar, lidar and the like.

Accordingly, the sensing unit 760 may acquire sensing signals with respect to vehicle collision information, vehicle position information (GPS information), heading information, speed information, acceleration information, vehicle tilt information, driving/reversing information, battery information, fuel information, tire information, vehicle lamp information, vehicle internal temperature information, vehicle internal humidity information, steering wheel rotation angle information and the like.

In addition, the sensing unit 760 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS) and the like.

Furthermore, the sensor unit 760 may include a biometric information sensor. The biometric information sensor senses and acquires biometric information of a person getting in the car. The biometric information may include fingerprint information, iris-scan information, retina-scan information, hand geometry information, facial recognition information and voice recognition information. The biometric information sensor may include a sensor for sensing biometric information of the person getting in the vehicle. Here, the internal camera and the microphone 723 can operate as a sensor. The biometric information sensor may acquire information on a hand and facial recognition information through the internal camera.

The output unit 740 outputs information processed in the controller 770 and may include a display unit 741, an audio output unit 742 and a haptic output unit 743.

The display unit 741 may display information processed in the controller 770. For example, the display 741 may display vehicle related information. The vehicle related information may include vehicle control information for direct control of the vehicle or vehicle driving assistance information for providing driving guidance to the vehicle-driving unit. In addition, the vehicle related information may include vehicle state information indicating the current state of the vehicle or vehicle driving information related to driving of the vehicle.

The display unit 741 may include at least one of a liquid crystal display (LCD), a thin film transistor-liquid crystal display (TFT LCD), an organic light-emitting diode (OLED), a flexible display, a 3D display and an e-ink display.

The display unit 741 may implement a touchscreen by forming a layered structure with a touch sensor or by being integrated with the touch sensor. The touchscreen may function as the user input unit 724 that provides an input interface between the vehicle 700 and the user and, simultaneously, provide an output interface between the vehicle 700 and the user. In this case, the display 741 may include a touch sensor for sensing touch applied to the display unit 741 such that a control command is input to the display unit 741 through touch. When touch is applied to the display unit 741, the touch sensor may sense the touch and the controller 770 may generate a control command corresponding to the touch based on the sensed touch. Input applied through touch may be text, figures or menu items that may be indicated or designated in various modes.

The display unit 741 may include a cluster to enable the driver to drive the vehicle and, simultaneously, to check vehicle state information or vehicle driving information. The cluster may be provided on the dashboard. In this case, the driver can check information displayed on the cluster while looking forward.

According to an implementation, the display unit 741 may be implemented as an HUD (Head Up Display). When the display 741 is implemented as an HUD, information may be output through a transparent display provided to the windshield of the vehicle. Alternatively, the display unit 741 may include a projection module so as to output information through an image projected onto the windshield.

The audio output unit 742 converts an electrical signal from the controller 770 into an audio signal and outputs the audio signal. To this end, the audio output unit 742 may include a speaker. The audio output unit 742 may output sound corresponding to operation of the user input unit 724.

The haptic output unit 743 generates haptic output. For example, the haptic output unit 743 may vibrate the steering wheel, a seat belt or a seat to enable the user to recognize haptic output.

The vehicle-driving unit 750 may control operations of various apparatuses of the vehicle. The vehicle-driving unit 750 may receive control signals from the apparatus 100 for parking a vehicle. The vehicle-driving unit 750 may control the apparatuses of the vehicle based on the control signals.

The vehicle-driving unit 750 may include a power source driver 751, a steering driver 752, a brake driver 753, a lamp driver 754, an air-conditioner driver 755, a window driver 756, an airbag driver 757, a sunroof driver 758 and a suspension driver 759.

The power source driver 751 may perform electronic control of a power source of the vehicle 700.

For example, when the power source is a fossil fuel based engine, the power source driver 751 may perform electronic control of the engine so as to control the output torque of the engine. When the power source driver 751 is an engine, the speed of the vehicle may be limited by restricting an engine output torque under the control of the controller 770.

Alternatively, when an electric motor is a power source, the power source driver 751 may control the motor. Accordingly, revolutions per minute (RPM), torque and the like of the motor may be controlled.

The power source driver 751 may receive an acceleration control signal from the vehicle parking apparatus 100. The power source driver 751 may control the power source according to the received acceleration control signal.

The steering driver 752 may electronically control a steering apparatus of the vehicle 700 so as to steer the vehicle 700. The steering driver 752 may receive a steering control signal from the vehicle parking apparatus 100. The power source driver 751 may control the steering apparatus to steer the vehicle according to the received steering control signal.

The brake driver 753 may electronically control a brake apparatus of the vehicle 700. For example, the brake driver 753 may reduce the speed of the vehicle 700 by controlling the operation of a brake provided to the wheels. As another example, the brake driver 753 may adjust the direction of the vehicle 700 to the left or right by differently operating brakes respectively provided to the left and right wheels. The brake driver 753 may receive a deceleration control signal from the vehicle parking apparatus 100. The brake driver 753 may control the brake apparatus according to the received deceleration control signal.

The lamp driver 754 may turn on/turn off lamps provided to the inside and outside of the vehicle 700. In addition, the lamp driver 754 may control illuminance, directions and the like of the lamps. For example, the lamp driver 754 may control the turn signal, brake lamp and the like.

The air-conditioner driver 755 may electronically control an air conditioner of the vehicle 700. For example, the air-conditioner driver 755 may control the air conditioner to supply chilly air to the inside of the vehicle 700 when the internal temperature of the vehicle is high.

The window driver 756 may electronically control a window apparatus of the vehicle 700. For example, the window driver 756 may control opening or closing of left and right windows provided to the side of the vehicle.

The airbag driver 757 may electronically control an airbag apparatus provided to the inside of the vehicle 700. For example, the airbag driver 757 may control the airbag apparatus to operate in a dangerous situation.

The sunroof driver 758 may electronically control a sunroof apparatus of the vehicle 700. For example, the sunroof driver 758 may control opening or closing of a sunroof.

The suspension driver 759 may electronically control a suspension apparatus of the vehicle 700. For example, the suspension driver 759 may reduce vibration of the vehicle 700 by controlling the suspension apparatus when the surface of the road is rough. The suspension driver 759 may receive a suspension control signal from the vehicle parking apparatus 100. The suspension driver 759 may control the suspension apparatus according to the received suspension control signal.

The memory 730 is electrically connected to the controller 770. The memory 730 may store fundamental data about the units, control data for operation control of the units and input/output data. The memory 730 may be various types of storage devices such as a ROM, a RAM, an EPROM, a flash drive and a hard drive. The memory 730 may store various types of data for the overall operation of the vehicle 700, such as programs for processing or control.

The interface 780 may function as a passage to various external devices connected to the vehicle 700. For example, the interface 780 may include a port that can be connected to the mobile terminal 600 and be connected to the mobile terminal 600 via the port. In this case, the interface 780 may exchange data with the mobile terminal 600.

In addition, the interface 780 may serve as a passage through which electric energy is supplied to the mobile terminal 600 connected thereto. When the mobile terminal 600 is electrically connected to the interface 780, the interface 780 provides electric energy supplied from the power supply 790 to the mobile terminal 600 under the control of the controller 770.

The controller 770 may control operations of the respective units of the vehicle 700. The controller 770 may be called an ECU (Electronic Control Unit).

The controller 770 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors) and other electrical units for executing the corresponding functions.

The power supply 790 may supply power necessary for operations of the respective components under the control of the controller 770. Particularly, the power supply 790 may be provided with power from a battery inside the vehicle 700.

The apparatus 100 for proving an around view may exchange data with the controller 770. Information, data or control signals generated in the apparatus 100 for providing an around view may be output to the controller 770. The apparatus 100 for providing an around view may be the apparatus for proving an around view described above with reference to FIGS. 1 to 6.

The vehicle display device 400 may exchange data with the controller 770. The controller 770 may receive navigation information from the vehicle display device 400 or a separate navigation system. Here, the navigation information may include information on a set destination, route information depending on the destination, map information regarding vehicle driving and vehicle location information.

FIGS. 8 to 19 are views for explaining operation of providing an image by the apparatus for proving an around view according to implementations of the present disclosure.

Figure 8:
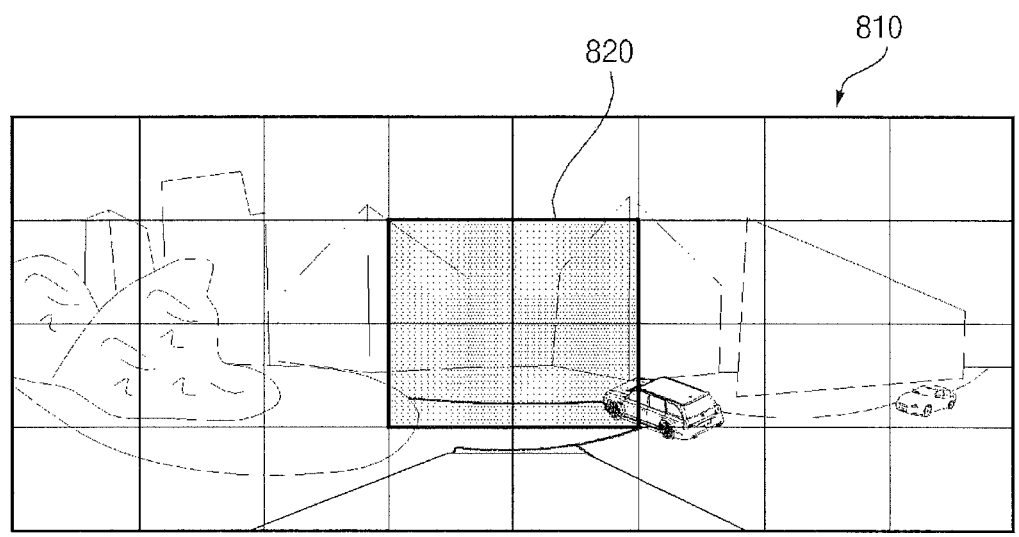
FIGS. 8 to 19 are diagrams illustrating examples of providing an image by an apparatus that provides an around-view.

FIG. 8 is a view for explaining operation of providing an omnidirectional image according to an implementation.

Referring to FIG. 8, the omnidirectional camera module 195 may include a plurality of cameras. The omnidirectional camera module 195 may acquire images of all directions of the surroundings of the vehicle 700 through the plurality of cameras. For example, the plurality of cameras may acquire a front view image, a rear view image, a left view image, a right view image, a bottom view image and a top view image of the vehicle 700.

The number of positions of the plurality of cameras may be appropriately determined such that the cameras acquire images of all directions of the surroundings of the vehicle 700.

The processor 170 may receive a plurality of images of the surroundings of the vehicle 700, acquired by the omnidirectional camera module 195. The processor 170 may generate an omnidirectional image based on the plurality of images of the surroundings of the vehicle 700. For example, the processor 170 may generate an omnidirectional image 810 by combining the plurality of images of the surroundings of the vehicle 700 through feature matching.

The processor 170 may display the omnidirectional image 810 in whole or in part through the display 151.

In some implementations, the processor 170 may display a region 820, which is part of the omnidirectional image 810, on the display 151 according to driving situation.

Figure 9:
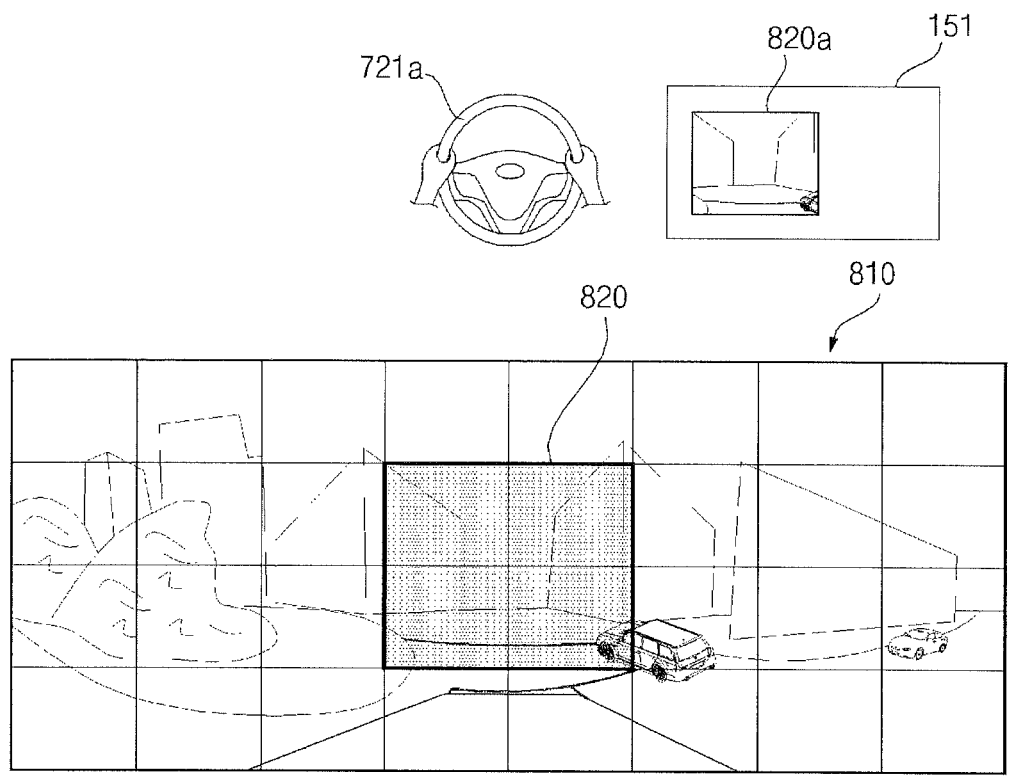
Figure 10:
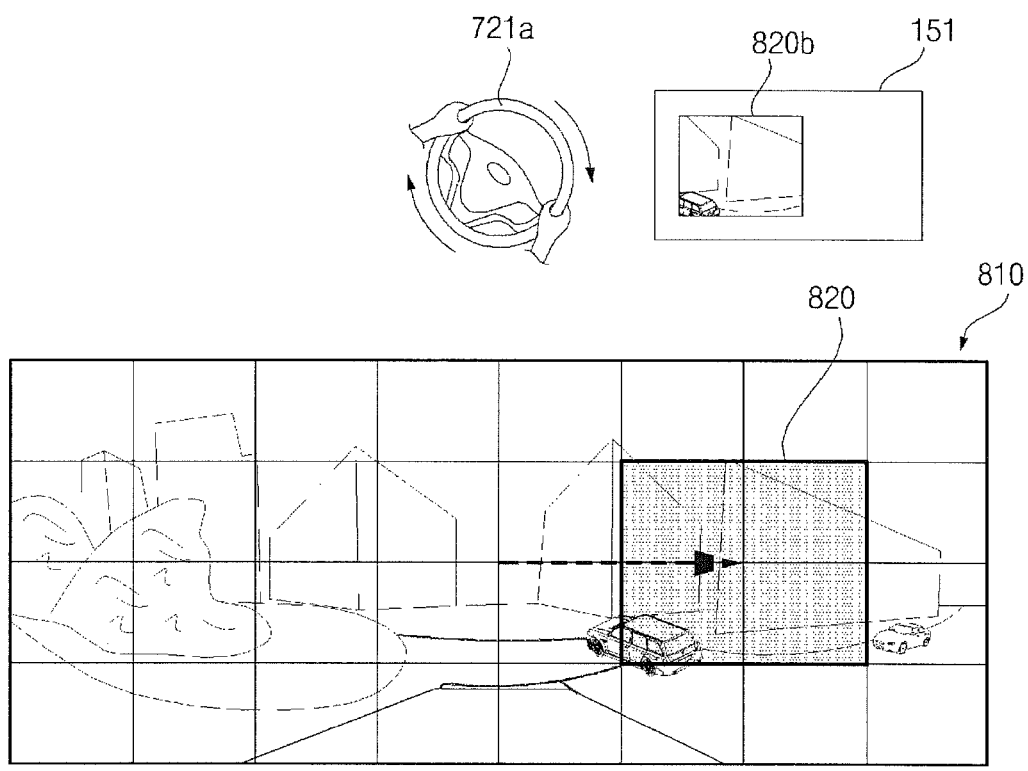
Figure 11:
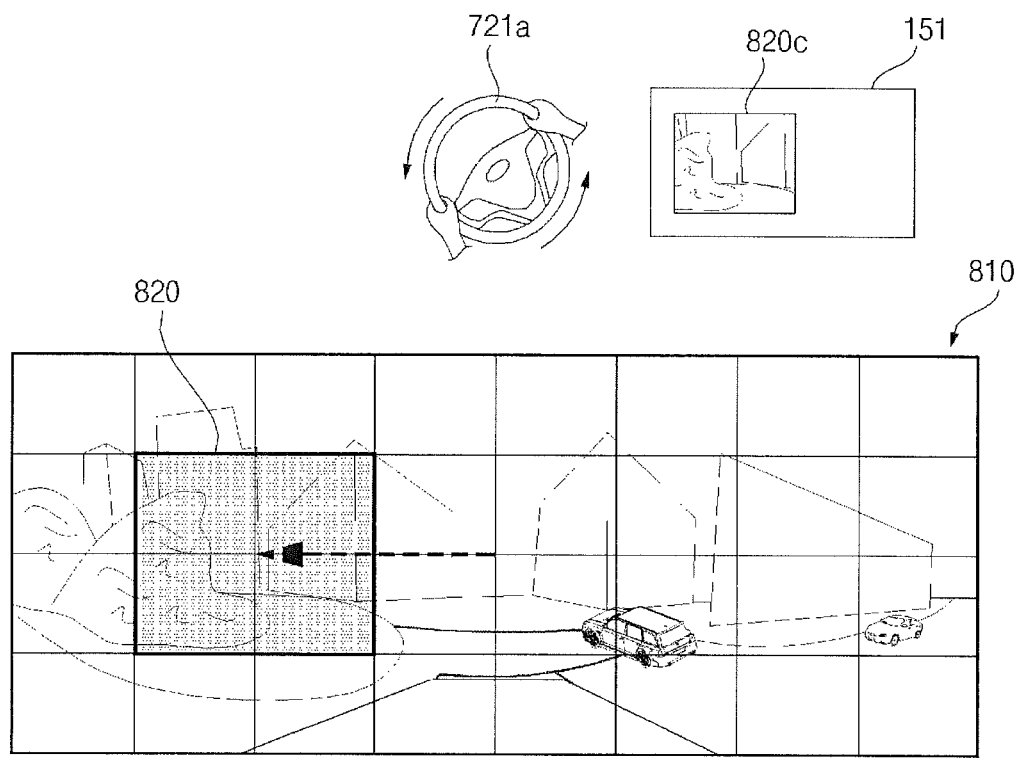

FIGS. 9 to 11 are views for explaining operation of controlling an image provided in response to steering angle information according to an implementation.

Referring to FIG. 9, when the vehicle 700 travels forward, the processor 170 may display a region 820*a* of the omnidirectional image 810 on the display 151. For example, the processor 170 may display a front view image included in the omnidirectional image 810 on the display 151.

When excessive information, which is not necessary for driving, is provided to the driver, the driver may be distracted, resulting in accidents. According to an implementation, when the vehicle 700 travels forward, a front view image included in the omnidirectional image 810 is provided according to driving situation. Accordingly, the driver can drive the vehicle focusing on the forward driving situation, resulting in safe driving.

Referring to FIGS. 10 and 11, the processor 170 may control an image of a left view or a right view of the vehicle 700 which is being driven forward based on the omnidirectional camera module 195 to be displayed on the display 151 in response to steering angle information.

As shown in FIG. 10, when steering input to the right is received through a steering wheel 721*a*, the processor 170 may display an image 820*b* of a right view of the vehicle 700 which is being driven forward, included in the omnidirectional image 810, on the display 151.

As shown in FIG. 11, when steering input to the left is received through a steering wheel 721*a*, the processor 170 may display an image 820*c* of a left view of the vehicle 700 which is being driven forward, included in the omnidirectional image 810, on the display 151.

When a steering angle is changed according to steering input, the processor 170 may change a displayed region in response to a changed steering angle.

The processor 170 may receive turn signal information through the interface 130. The processor 170 may control the position of a region of the omnidirectional image, which is displayed on the display 151, in response to the turn signal information.

When a right turn signal is received while the vehicle 700 is being driven forward, the processor 170 may display the image 820*b* of the right view of the vehicle 700, which is being driven forward, on the display 151, as shown in FIG. 10.

When a left turn signal is received while the vehicle 700 is being driven forward, the processor 170 may display the image 820*c* of the left view of the vehicle 700 which is being driven forward on the display 151, as shown in FIG. 11.

Figure 12:
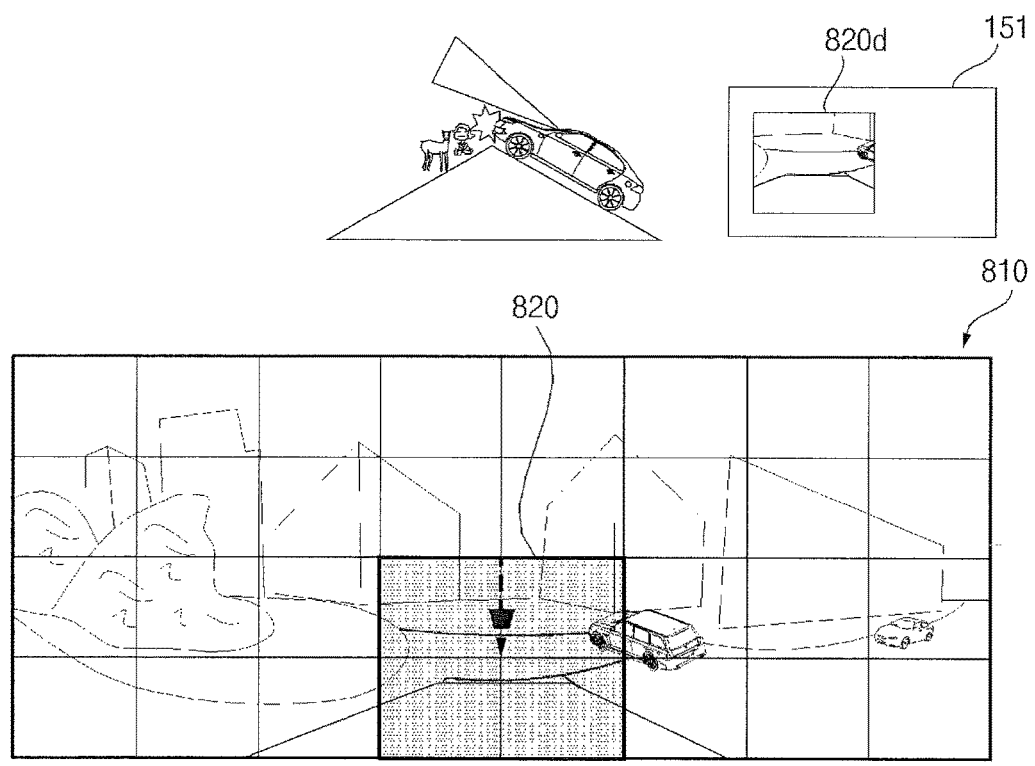
Figure 13:
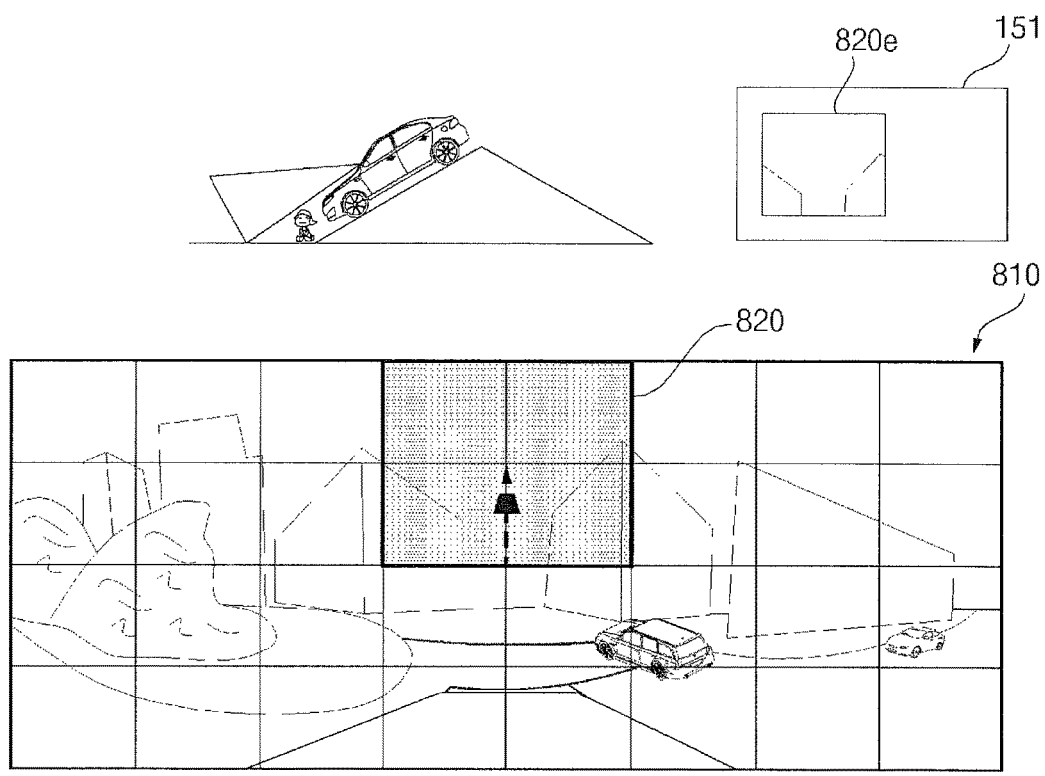

FIGS. 12 and 13 are views for explaining operation of providing an image in response to vehicle tilt information according to an implementation.

Referring to FIGS. 12 and 13, the processor 170 may control an image of a top view or a bottom view of the vehicle 700 which is being driven forward based on the omnidirectional camera module 195 to be displayed on the display 151 in response to vehicle tilt information.

The vehicle 700 may travel on an uneven road.

When the vehicle travels on a road with a decreasing gradient, the vehicle body tilts downward. For example, a section in which a flat road changes to a downhill road, a section in which an uphill road changes to a flat road and a section in which an uphill road changes to a downhill road may be road sections with decreasing gradients.

Conversely, when the vehicle travels on a road with an increasing gradient, the vehicle body tilts upward. For example, a section in which a flat road changes to an uphill road, a section in which a downhill road changes to a flat road and a section in which a downhill road changes to an uphill may be road sections with increasing gradients.

As shown in FIG. 12, when the vehicle 700 travels on a road with a decreasing gradient, the processor 170 may display an image 820*d* of a bottom view of the vehicle 700, which is being driven forward, on the display 151.

The processor 170 may detect a point at which the gradient of the road starts to decrease by processing the images acquired by the omnidirectional camera module 195. The point at which the gradient of the road starts to decrease may be referred to as an inflection point. The processor 170 may display an image of a bottom view of the vehicle 700, which is being driven forward, on the display 151 a predetermined distance ahead of the inflection point.

As shown in FIG. 13, when the vehicle 700 travels on a road with an increasing gradient, the processor 170 may display an image 820*e* of a top view of the vehicle 700, which is being driven forward, on the display 151.

The processor 170 may detect a point at which the gradient of the road starts to increase by processing the images acquired by the omnidirectional camera module 195. The point at which the gradient of the road starts to decrease may be referred to as an inflection point. The processor 170 may display an image of a top view of the vehicle 700, which is being driven forward, on the display 151 a predetermined distance ahead of the inflection point.

Figure 14:
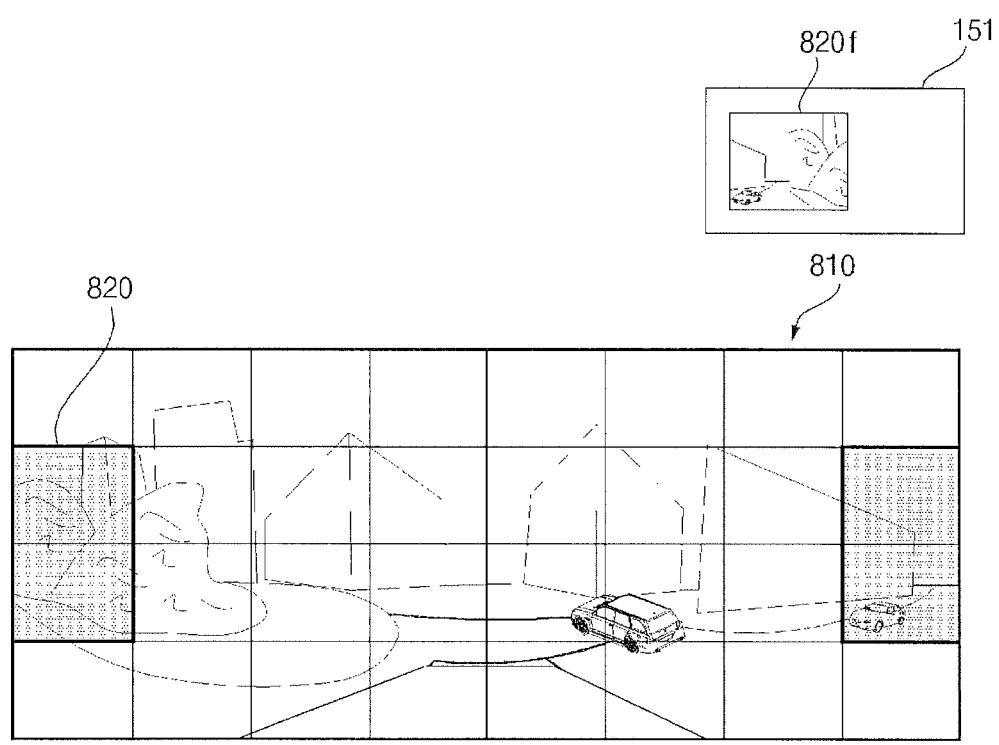

FIG. 14 is a view for explaining operation of providing an image when the vehicle 700 is driven backward according to an implementation.

Referring to FIG. 14, when the vehicle 700 is driven backward, the processor 170 may display a region 820*f* of the omnidirectional image 810 on the display 151. For example, the processor 170 may display a rear view image included in the omnidirectional image 810 on the display 151.

When excessive information, which is not necessary for driving, is provided to the driver, the driver may be distracted, resulting in accidents. According to an implementation, when the vehicle 700 travels backward, a rear view image included in the omnidirectional image 810 is provided according to driving situation. Accordingly, the driver can drive the vehicle focusing on the forward driving situation, resulting in safe driving.

When the vehicle 700 is driven backward, the processor 170 may control an image of a left view or a right view of the vehicle 700 which is being driven backward based on the omnidirectional camera module 195 to be displayed on the display 151 in response to steering angle information, similarly to the forward driving case.

For example, when steering input corresponding to turning of the steering wheel to the right is received, the processor 170 may display an image of a right view of the vehicle 700 which is being driven backward, included in the omnidirectional image 810, on the display 151.

For example, when steering input corresponding to turning of the steering wheel to the left is received, the processor 170 may display an image of a left view of the vehicle 700 which is being driven backward, included in the omnidirectional image 810, on the display 151.

Figure 15:
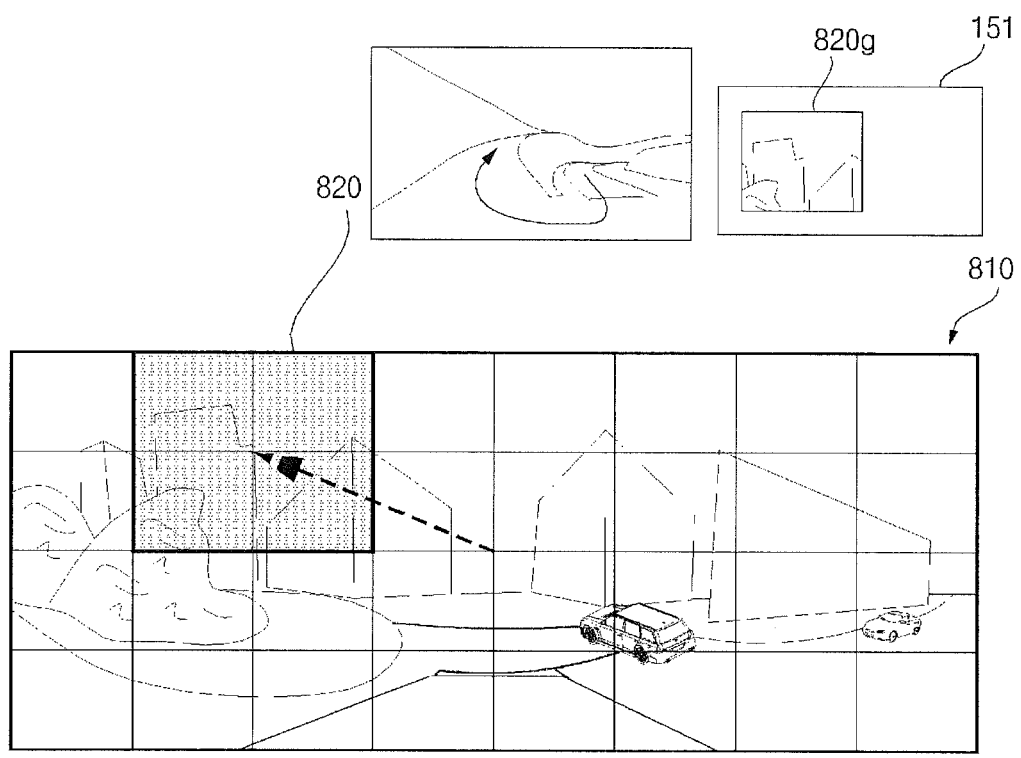

FIG. 15 is a view for explaining operation of providing an image in response to steering angle information and vehicle tilt information according to an implementation.

The vehicle 700 may travel forward on a curved road with a gradient. In this case, the processor 170 may control an image 820*g* corresponding to steering angle information and vehicle tilt information on the display 151.

When steering input corresponding to turning of the steering wheel to the left is received and tilting of the vehicle body increases, the processor 170 may display the image 820*g* of a left top view of the vehicle 700, which is being driven forward, on the display 151.

When steering input corresponding to turning of the steering wheel to the left is received and tilting of the vehicle body decreases, the processor 170 may display an image of a left bottom view of the vehicle 700, which is being driven forward, on the display 151.

When steering input corresponding to turning of the steering wheel to the right is received and tilting of the vehicle body increases, the processor 170 may display an image of a right top view of the vehicle 700, which is being driven forward, on the display 151.

When steering input corresponding to turning of the steering wheel to the right is received and tilting of the vehicle body decreases, the processor 170 may display an image of a right bottom view of the vehicle 700, which is being driven forward, on the display 151.

Figure 16:
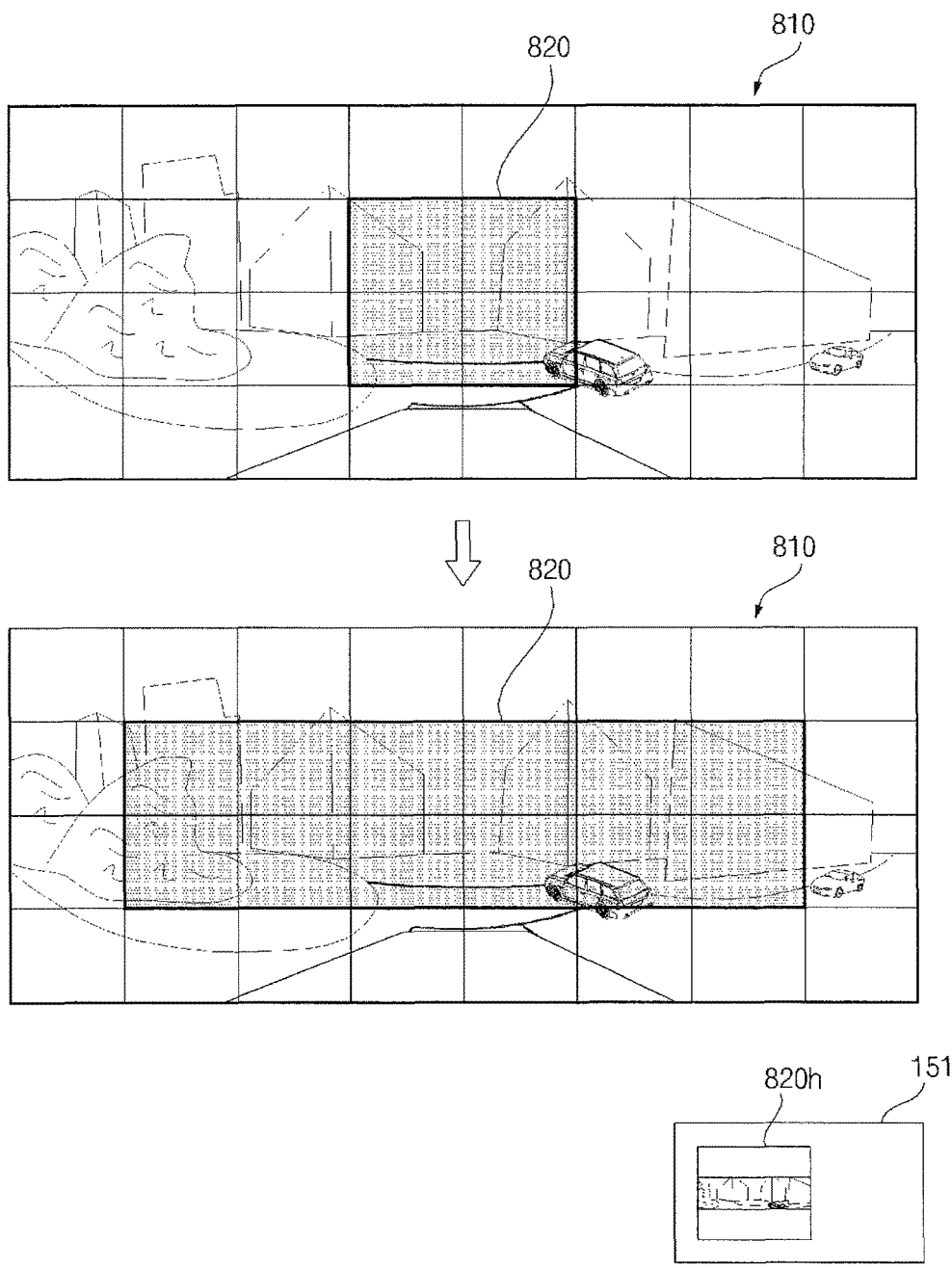

FIG. 16 is a diagram illustrating an example of providing an image when the vehicle 700 enters an intersection, an access road or an exit.

Referring to FIG. 16, the processor 170 may determine that the vehicle 700 enters an intersection, an access road, or an exit while traveling. In this case, the processor 170 may control a region 820*h* of the omnidirectional image 810, which is displayed on the display 151, to be extended.

For example, the processor 170 may control the region of the omnidirectional image 810, which is displayed on the display 151, to be extended in the horizontal direction from a region displayed on the display 151 when the vehicle 700 travels forward on a general road.

The processor 170 may determine whether the vehicle 700 enters an intersection, an access road or an exit based on position information of the vehicle 700. The processor 170 may detect an intersection, an access road or an exit based on images of the surroundings of the vehicle. For example, the processor 170 may detect a traffic light at an intersection, a traffic sign of an access road or an exit and the like.

When the vehicle 700 enters an intersection, an access road or an exit, the driver needs to keep eyes forward while having a wide view in the horizontal direction because other vehicles may travel by the vehicle 700 in the case of an intersection and the vehicle 700 needs to travel in a road section curved at a large angle in the case of an access road or an exit. According to the present implementation, when the vehicle 700 enters an intersection, an access road or an exit, the processor 170 may control the region of the omnidirectional image 810, which is displayed on the display 151, to be extended so as to provide a wide view image to the driver in a special situation, promoting safe driving.

Figure 17:
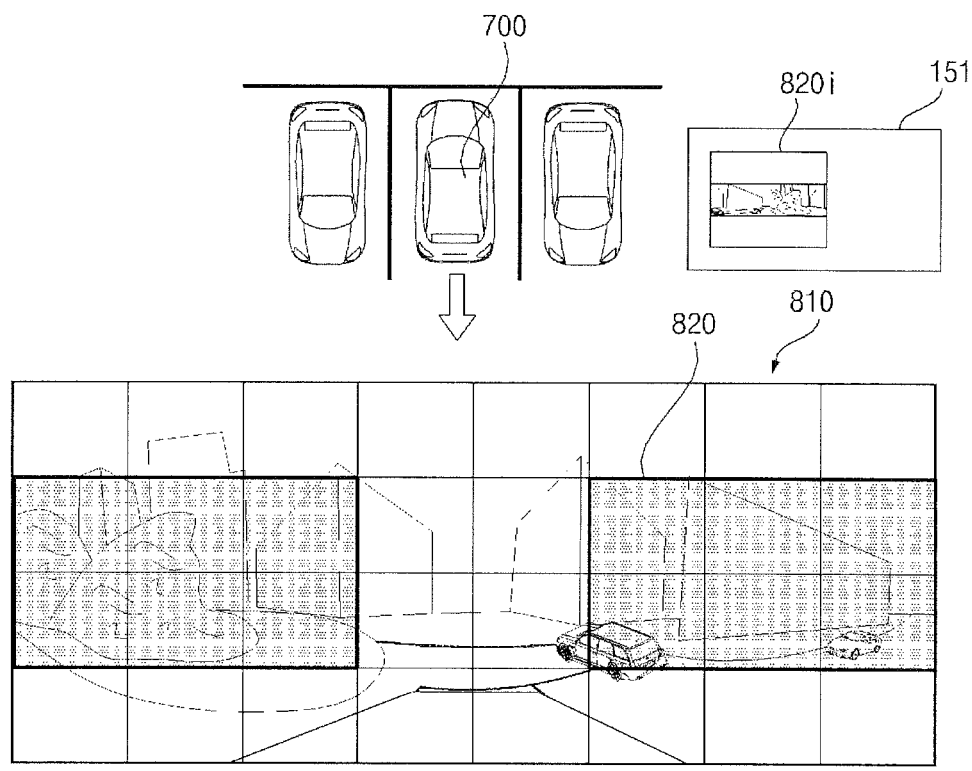

FIG. 17 is a view for explaining operation of providing an image when the vehicle 700 is being backed out of a parking space according to an implementation.

Referring to FIG. 17, the vehicle 700 may back out of a parking space. In this case, the processor 170 may control a region of the omnidirectional image 810, which is displayed on the display 151, to be extended (820*i*).

For example, the processor 170 may control the region of the omnidirectional image 810, which is displayed on the display 151, to be extended in the horizontal direction from a region displayed on the display 151 when the vehicle 700 is driven backward on a general road.

The processor 170 may determine whether the vehicle 700 is backing out of a parking space based on the position information of the vehicle 700 or images of the surroundings of the vehicle 700.

When the vehicle 700 is backing out of a parking space, the driver needs to keep eyes backward while having a wide view in the horizontal direction. In this case, the processor 170 may control the region of the omnidirectional image 810, which is displayed on the display 151, to be extended so as to provide a wide view image to the driver in a special situation, promoting safe driving.

Figure 18:
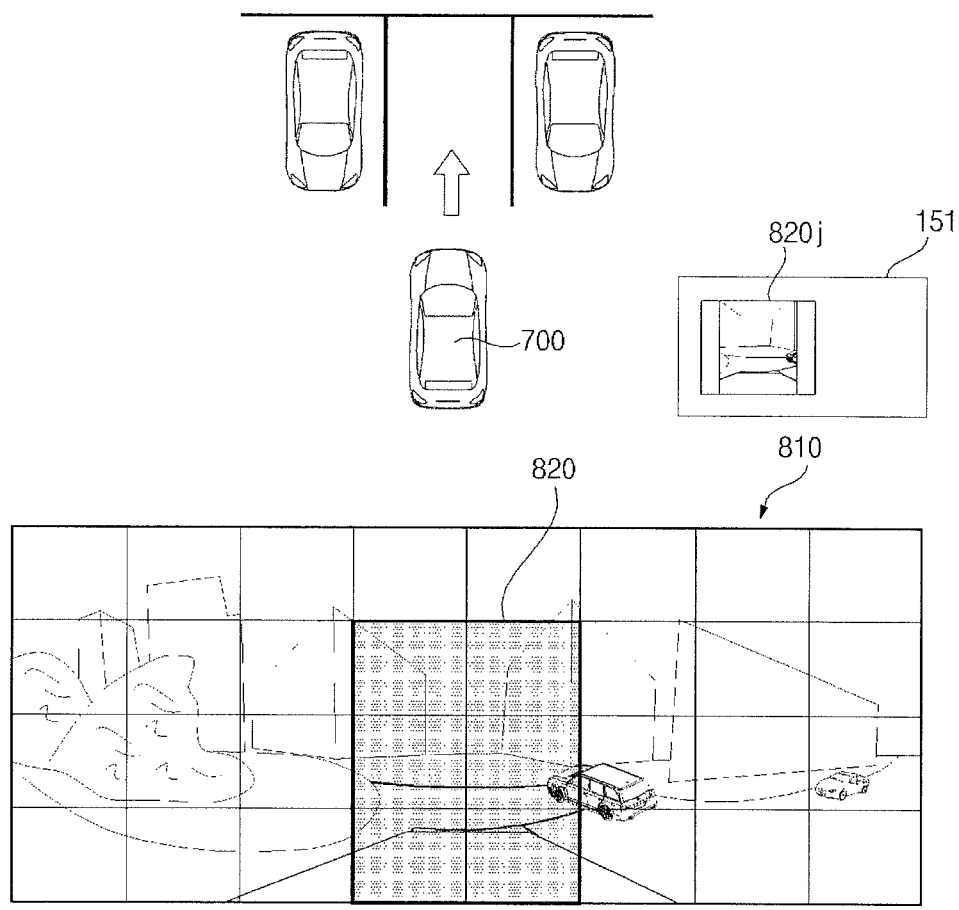

FIG. 18 is a view for explaining operation of providing an image in the case of forward parking of the vehicle 700 according to an implementation.

Referring to FIG. 18, the vehicle 700 may be parked forward. In this case, the processor 170 may control a region of the omnidirectional image 810, which is displayed on the display 151, to be extended downward (802*j*).

For example, the processor 170 may control the region displayed on the display 151 to be extended downward from the region displayed on the display 151 when the vehicle 700 is driven forward on a general road.

The processor 170 may determine whether the vehicle 700 is parked forward in a parking lot based on the position information of the vehicle 700 or images of the surroundings of the vehicle 700.

When the vehicle 700 is parked forward in a parking space, the driver may have difficulty noticing a low obstacle because the low obstacle may not be visible due to the engine compartment of the vehicle. In this case, a user may be able to check the low obstacle by viewing an image as provided in the present implementation, thus helping to prevent the vehicle from being damaged. For example, the low obstacle may be a curb, a stopper, a traffic cone, or the like.

Figure 19:
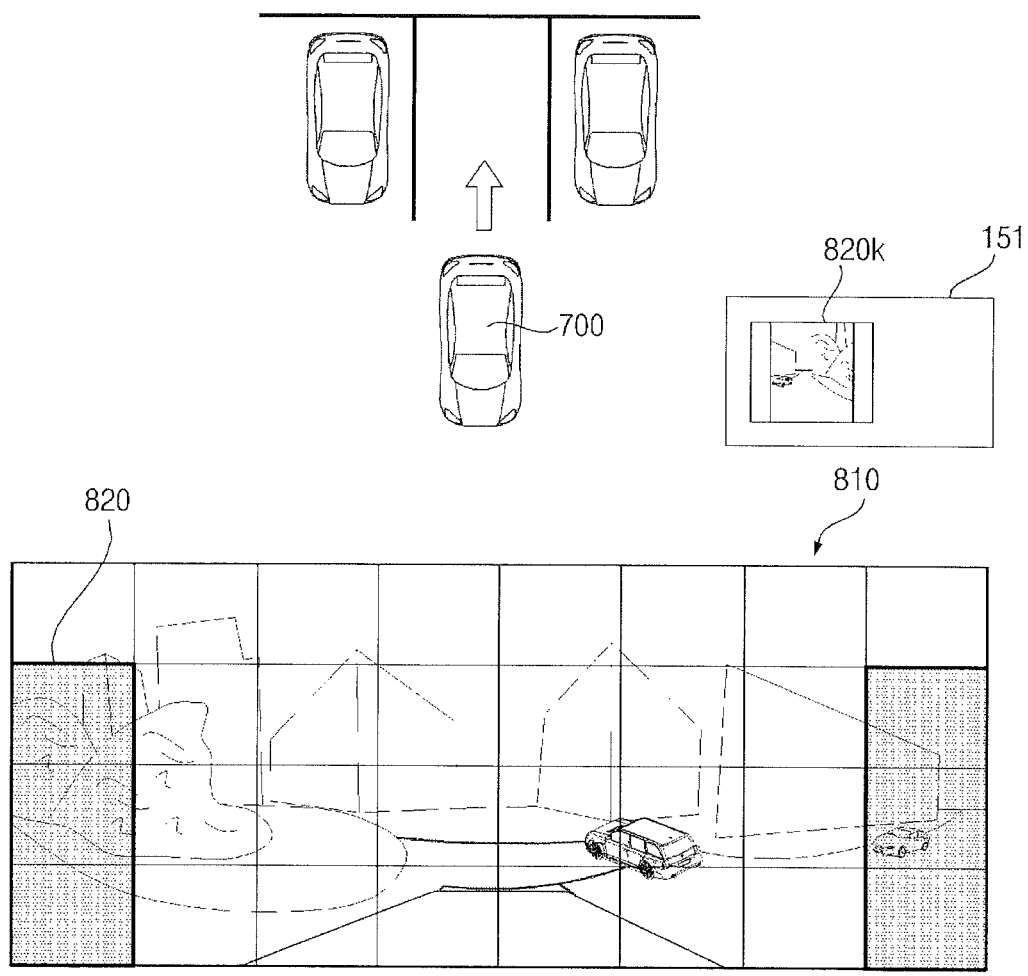

FIG. 19 is a diagram illustrating an example of providing an image in the case of reverse parking of the vehicle 700.

Referring to FIG. 19, the vehicle 700 may be reverse parked. In this case, the processor 170 may control a region of the omnidirectional image 810, which is displayed on the display 151, to be extended downward (802k).

For example, the processor 170 may control the region displayed on the display 151 to be extended downward from the region displayed on the display 151 when the vehicle 700 is driven in reverse on a general road.

The processor 170 may determine whether the vehicle 700 is reverse parked in a parking lot based on the position information of the vehicle 700 or images of the surroundings of the vehicle 700.

When the vehicle 700 is reverse parked in a parking space, the driver may have difficulty checking a low obstacle since the low obstacle may not be visible due to the body of the vehicle. It may be difficult to check a low obstacle even using an AVM apparatus which provides a side mirror and a top view image. Implementations described herein enable checking the low obstacle by providing an image as described in the present implementation, thus helping to prevent the vehicle from being damaged. For example, the low obstacle may be a curb, a stopper, a traffic cone or the like.

Implementations described herein may be implemented as code that may be written to a computer-readable recording medium and may thus be read by a computer. The computer-readable recording medium may be any type of recording device in which data may be stored in a computer-readable manner. Examples of the computer-readable recording medium include a HDD (Hard Disk Drive), a SSD (Solid State Disc), SDD (Silicon Disc Drive), a ROM, a RAM, a CD-ROM, a magnetic tape, a floppy disk, optical data storage, and a carrier wave, e.g., data transmission over the Internet. The computer may include the processor 170 or the controller 770. Although the examples above have been disclosed for illustrative purposes, those skilled in the art will appreciate that various modifications, additions and substitutions are possible, without departing from the scope and spirit of the invention as disclosed in the accompanying claims.

What is claimed is:

1. An apparatus configured to provide a view around a vehicle, the apparatus comprising:
a display unit;
at least one omnidirectional camera module attached to the vehicle and configured to acquire images of surroundings of the vehicle;
an interface unit configured to receive steering angle information and vehicle tilt information; and
a processor configured to:
generate an omnidirectional image based on the images of the surroundings of the vehicle acquired by the at least one omnidirectional camera module;
determine a region in the omnidirectional image that corresponds to the steering angle information or the vehicle tilt information; and
control the display unit to display an image of the region in the omnidirectional image that corresponds to the steering angle information or the vehicle tilt information, wherein:
the at least one omnidirectional camera module comprises a plurality of cameras,
the processor is further configured to generate the omnidirectional image based on the images of the surroundings of the vehicle by combining a plurality of images acquired by the plurality of cameras to provide the omnidirectional image of an entire area surrounding the vehicle,
the interface unit is configured to receive turn signal information of the vehicle, and
the processor is further configured to, based on the turn signal information of the vehicle, control a size of the region in the omnidirectional image displayed on the display unit to adjust a field of view of the region.

2. The apparatus of claim 1, wherein the at least one omnidirectional camera module is configured to acquire the images of the surroundings of the vehicle by acquiring a front view image, a rear view image, a left view image, a right view image, a bottom view image, and a top view image of the vehicle.

3. The apparatus of claim 1, wherein the at least one omnidirectional camera module comprises:
a first omnidirectional camera module attached to a front of the vehicle and configured to acquire a first omnidirectional image of a front view of the vehicle; and
a second omnidirectional camera module attached to a rear of the vehicle and configured to acquire a second omnidirectional image of a rear view of the vehicle.

4. The apparatus of claim 1, wherein the processor is configured to:
determine that the vehicle travels in a forward direction;
determine, from among front view images included in the omnidirectional image and based on the determination that the vehicle travels in the forward direction, a front view image of a region that corresponds to the steering angle information or the vehicle tilt information; and
control the display unit to display the front view image of the region that corresponds to the steering angle information or the vehicle tilt information while the vehicle travels in the forward direction.

5. The apparatus of claim 4, wherein the processor is configured to, based on the steering angle information, control the display unit to display an image of a left view or an image of a right view of the vehicle travelling in the forward direction.

6. The apparatus of claim 5, wherein the processor is configured to, based on the vehicle tilt information, control the display unit to display an image of a top view or an image of a bottom view of the vehicle travelling in the forward direction.

7. The apparatus of claim 6, wherein the processor is configured to:
determine that the vehicle travels in a first section of a road in which a flat road portion changes to an uphill road portion or in a second section of the road in which a flat road portion changes to a downhill road portion;

determine a first point at which the flat road portion changes to the uphill road portion or a second point at which the flat road portion changes to the downhill road portion; and based on the determination that the vehicle travels in the first section or in the second section of the road, control the display unit to display the image of the top view or the image of the bottom view at a predetermined distance ahead of the first point or the second point while the vehicle travels in the first section or in the second section.

8. The apparatus of claim 1, wherein the processor is configured to:

determine that the vehicle travels in a reverse direction;

determine, from among rear view images included in the omnidirectional image and based on the determination that the vehicle travels in the reverse direction, a rear view image of a region that corresponds to the steering angle information or the vehicle tilt information; and control the display unit to display the rear view image of the region that corresponds to the steering angle information or the vehicle tilt information while the vehicle travels in the reverse direction.

9. The apparatus of claim 8, wherein the processor is configured to, based on the steering angle information, control the display unit to display an image of a left view or a right view of the vehicle travelling in the reverse direction.

10. The apparatus of claim 9, wherein the processor is configured to, based on the vehicle tilt information, control the display unit to display an image of a top view or a bottom view of the vehicle travelling in the reverse direction.

11. The apparatus of claim 10, wherein the processor is configured to:

determine that the vehicle travels in a first section of a road in which a flat road portion changes to an uphill road portion or in a second section of the road in which a flat road portion changes to a downhill road portion;

determine a first point at which the flat road portion changes to the uphill road portion or a second point at which the flat road portion changes to the downhill road portion; and based on the determination that the vehicle travels in the first section or in the second section of the road, control the display unit to display the image of the top view or the image of the bottom view at a predetermined distance ahead of the first point or the second point while the vehicle travels in the first section or in the second section.

12. The apparatus of claim 1, wherein the processor is configured to:

determine that the vehicle travels along a U-turn route;

determine, from among front view images and rear view images included in the omnidirectional image and based on the determination that the vehicle travels along the U-turn route, an image of a region that corresponds to the U-turn route; and control the display unit to display the image of the region that corresponds to the U-turn route while the vehicle travels along the U-turn route.

13. The apparatus of claim 1, wherein:

the interface unit is configured to receive position information of the vehicle, and the processor is configured to, based on the position information of the vehicle, control a size of the region in the omnidirectional image displayed on the display unit to adjust a field of view of the region.

14. The apparatus of claim 13, wherein the processor is configured to:

determine that the vehicle enters an intersection, an access road, or an exit; and control the size of the region in the omnidirectional image displayed on the display unit to expand the field of view of the region.

15. The apparatus of claim 1, wherein:

the interface unit is configured to receive vehicle speed information, and the processor is configured to, based on the vehicle speed information, control a size of the region in the omnidirectional image displayed on the display unit to adjust a field of view of the region.

* * * * *